US011917540B2

(12) United States Patent
Kneckt et al.

(10) Patent No.: US 11,917,540 B2
(45) Date of Patent: Feb. 27, 2024

(54) TARGET WAKE TIME SCHEME FOR MULTICAST COMMUNICATION

(71) Applicant: Apple Inc., Cupertino, CA (US)

(72) Inventors: Jarkko L. Kneckt, Los Gatos, CA (US); Christiaan A. Hartman, San Jose, CA (US); Qi Wang, Sunnyvale, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 233 days.

(21) Appl. No.: 16/403,983

(22) Filed: May 6, 2019

(65) Prior Publication Data

US 2020/0045634 A1  Feb. 6, 2020

Related U.S. Application Data

(60) Provisional application No. 62/714,416, filed on Aug. 3, 2018.

(51) Int. Cl.
*H04W 52/02* (2009.01)
*H04W 40/24* (2009.01)
*H04L 12/18* (2006.01)

(52) U.S. Cl.
CPC ....... *H04W 52/0229* (2013.01); *H04L 12/189* (2013.01); *H04W 40/244* (2013.01); *H04W 52/0216* (2013.01)

(58) Field of Classification Search
CPC .......... H04W 52/0229; H04W 52/0216; H04L 12/18; H04L 12/189
See application file for complete search history.

(56) References Cited

U.S. PATENT DOCUMENTS

| | | | |
|---|---|---|---|
| 2016/0174219 A1* | 6/2016 | Patil | H04L 5/0055 370/329 |
| 2016/0219510 A1* | 7/2016 | Asterjadhi | H04L 5/0007 |
| 2017/0353946 A1* | 12/2017 | Rico Alvarino | H04W 76/34 |
| 2018/0192372 A1* | 7/2018 | Park | H04W 52/0229 |
| 2018/0295573 A1* | 10/2018 | Gidvani | H04W 52/0229 |
| 2018/0302194 A1* | 10/2018 | Wang | H04L 1/1848 |
| 2019/0141631 A1* | 5/2019 | Patil | H04W 52/0216 |
| 2019/0200171 A1* | 6/2019 | Huang | H04W 4/06 |
| 2020/0008095 A1* | 1/2020 | Patil | H04W 4/06 |

\* cited by examiner

*Primary Examiner* — Robert C Scheibel
(74) *Attorney, Agent, or Firm* — Sterne, Kessler, Goldstein & Fox P.L.L.C.

(57) ABSTRACT

Some embodiments of this disclosure include apparatuses and methods for implementing a target wake time (TWT) technique for multicast communication. For example, some embodiments relate to a method including configuring a target wake time (TWT) process for delivering one or more multicast packets to a group of electronic devices. The method further includes determining that a service period associated with the TWT process has started and transmitting, in accordance with the TWT process, the one or more multicast packets during the service period, where the one or more transmitted multicast packets are addressed to the group of electronic devices.

19 Claims, 11 Drawing Sheets

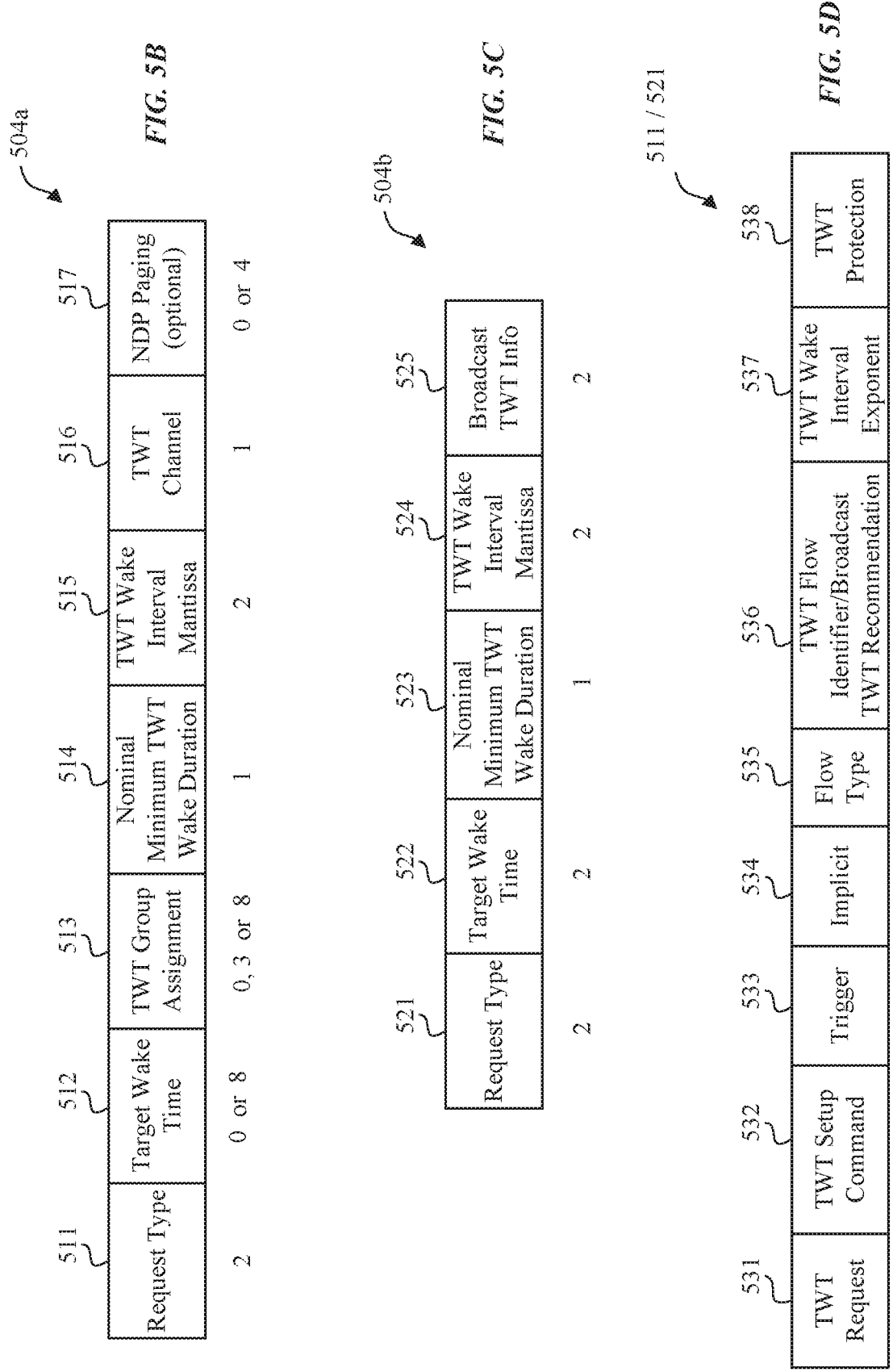

| 901 | 902 | 903 | 904 | 905 | 906 | 907 | 908 |
|---|---|---|---|---|---|---|---|
| Element ID | Length | BSSID | BSSID Information | Operating Class | Channel Number | PHY Type | Optional Subelements |
| 1 | 1 | 6 | 4 | 1 | 1 | 1 | variable |

*FIG. 9A*

| 921 | 922 | 923 | 924 | 925 | 926 | 927 | 928 | 929 | 930 | 931 | 932 | 933 | 934 |
|---|---|---|---|---|---|---|---|---|---|---|---|---|---|
| AP Reachability | Security | Key Scope | Capabilities | Mobility Domain | High Throughput | Very High Throughput | FTM | High Efficiency | FR BSS | GCR-TWT | GC For NonAssociated | All GC | Reserved |
| 2 | 1 | 1 | 6 | 1 | 1 | 1 | 1 | 1 | 1 | 1 | 1 | 1 | 13 |

*FIG. 9B*

TARGET WAKE TIME SCHEME FOR MULTICAST COMMUNICATION

CROSS-REFERENCE TO RELATED APPLICATIONS

The present application claims the benefit of U.S. Provisional Patent Application No. 62/714,416, filed on Aug. 3, 2018, which is hereby incorporated by reference in its entirety.

BACKGROUND

Field

The described embodiments generally relate to channel access in wireless communications.

Related Art

One wireless communication technique for providing content to multiple devices can use a multicast group. For example, one device that is the source of the multicast data (e.g., source device, source node, or source) can transmit the multicast data to multiple devices that are members of the multicast group (e.g., sink devices, sink nodes, or sinks.) By using the multicast group and multicast transmission, the resources for, for example, generating the data, processing the data, and communicating the data can be shared between multiple devices. Therefore, the overall air time, the air interface capacity, and power consumption can be improved.

According to some examples, the multicast communication can be based on communication techniques compatible with Institute of Electrical and Electronics Engineers (IEEE) 802.11 standards. For example, the multicast communication can be used within a wireless local area Network (WLAN). In this example, an access point (AP) can operate as the source device. However, the multicast communication mechanism can have sources of inefficiencies. For example, the multicast frames can be transmitted with some delays (e.g., transmitted after Delivery Traffic Indication Map (DTIM) beacons with long DTIM intervals.) These delays can be too long for real time traffic. In other examples, the source device might not indicate the addresses of the group addressed multicast frames that are transmitted after DTIM beacons. Therefore, the sink devices receive all transmitted frames, which results in more power consumption.

SUMMARY

Some embodiments of this disclosure include apparatuses and methods for implementing a target wake time (TWT) scheme (or technique) for multicast communication.

Some embodiments relate to a method including configuring a target wake time (TWT) process for delivery of one or more multicast packets to a group of electronic devices. The method further includes determining that a service period associated with the TWT process has started and transmitting, in accordance with the TWT process, the one or more multicast packets during the service period, where the one or more transmitted multicast packets are addressed to the group of electronic devices.

Some embodiments relate to an electronic device. The electronic device includes a transceiver that transmits and receives wireless communications and one or more processors communicatively coupled to the transceiver. The one or more processors configure a target wake time (TWT) process for delivering one or more multicast packets to a group of electronic devices and communicate, using the transceiver, information associated with the TWT process to at least one electronic device in the group of electronic devices. The one or more processor further determine that a service period associated with the TWT process has started and transmit, using the transceiver and in accordance with the TWT process, the one or more multicast packets to the group of electronic devices during the service period.

Some embodiments relate to a non-transitory computer-readable medium storing instructions. When the instructions are executed by a processor of an electronic device, the instructions cause the processor to perform operations including configuring a target wake time (TWT) process for delivering one or more multicast packets to a group of electronic devices. Configuring the TWT process includes determining a TWT schedule in response to a request for the TWT process from at least one electronic device in the group of electronic devices or determining a broadcast TWT schedule. The operations further include determining that a service period associated with the TWT process has started and transmitting the one or more multicast packets to the group of electronic devices during the service period.

This Summary is provided merely for purposes of illustrating some embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

FIGS. 5A-5D illustrate an exemplary TWT element format for implementing TWT for multicast communication, according to some embodiments of the disclosure.

FIGS. 9A-9B illustrate an exemplary neighbor report element format, according to some embodiments of the disclosure.

Figure 1:
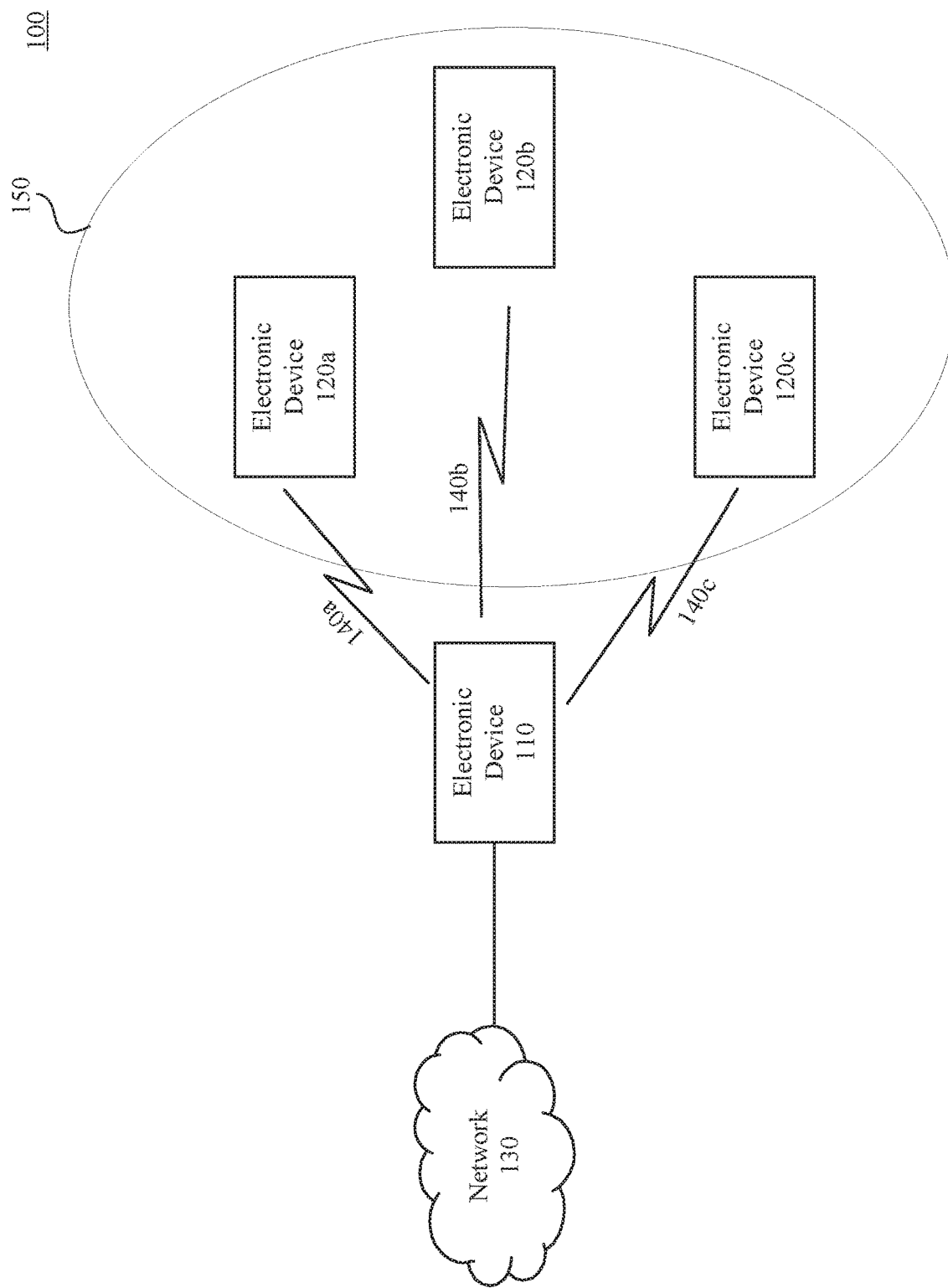
FIG. 1 illustrates an example system implementing a multicast communication with TWT, according to some embodiments of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some embodiments of this disclosure include apparatuses and methods for implementing a target wake time (TWT) scheme (or technique) for multicast communication. Multicast communication (e.g., Groupcast with retries (GCR)) is a scalable and reliable transmission mechanism for transmitting multicast packets. Enabling the TWT scheme with the multicast communication can reduce power consumption at receiver devices and shorten transmission delays, according to some embodiment of this disclosure. Additionally, some embodiments of this disclosure describe methods for early termination of multicast service periods to optimize power consumption and reliable reception of multicast packets.

In general, the information communicated between the electronic devices in the disclosed embodiments may be conveyed in packets or frames that are transmitted and received by radios in the electronic devices in accordance with a communication protocol such as an Institute of Electrical and Electronics Engineers (IEEE) 802.11 standard, Bluetooth™ (from the Bluetooth Special Interest Group of Kirkland, Washington), a cellular-telephone communication protocol, and/or another type of wireless interface (such as a peer-to-peer communication technique. Some of the embodiments are discussed with respect to wireless local area Network (WLAN), but the embodiments of this disclosure are not limited to WLAN.

According to some embodiments, the multicast communication can be implemented using Groupcast with retries (GCR), which is a scalable transmission mechanism that improves reliability of multicast packet delivery. In the multicast communication, a source electronic device is configured to transmit multicast packets (e.g., is configured to multicast the packets) to member of a multicast group. In some examples, the multicast communication does not use any feedback (e.g., acknowledgment) from the members of the multicast group (e.g., the sink electronic devices.) In other words, no acknowledgment from the sink electronic devices is used. In these examples, the source electronic device can be configured to retransmit all or a selected group of the multicast packets without any acknowledgments.

In another example, the multicast communication can use block acknowledgments from the sink electronic devices. In this example, after transmitting the multicast packets, the source electronic device can request block acknowledgments from one or more members of the multicast group. The source electronic device may retransmit the failed multicast packet(s) to the members of the multicast group as retransmitted multicast packet(s) (e.g., group-addressed packet(s)). Yet in another example, the multicast communication can use block acknowledgments from the sink electronic devices but the source electronic device may retransmit the failed multicast packet(s) as individually addressed packet(s) to the sink electronic devices that did not receive the multicast packet(s).

Some of the embodiments of this disclosure apply the TWT scheme to the multicast communication. TWT is a function that enables, for example, a source electronic device to negotiate and/or define a specific time or a set of times for sink electronic devices to access a medium. As discussed in more detail, after a TWT schedule is configured, the source electronic device can transmit and/or retransmit multicast packets to the members of the multicast group and/or to unassociated electronic devices during the scheduled period(s). Accordingly, the members of the multicast group and/or unassociated electronic devices can be awake during the scheduled periods to receive the multicast packets and can be asleep or perform other activities outside of the scheduled periods.

FIG. 1 illustrates an example system 100 implementing a multicast communication with TWT, according to some embodiments of the disclosure. Example system 100 is provided for the purpose of illustration only and does not limit the disclosed embodiments. System 100 may include, but is not limited to, electronic devices 110, 120 and network 130. Electronic devices 110 and 120a-120c may include, but are not limited to, WLAN stations such as wireless communication devices, smart phones, laptops, desktops, tablets, personal assistants, monitors, and televisions. Electronic devices 110 and 120a-120c may support latency sensitive applications (e.g., video and/or audio streaming.)

According to some embodiments, electronic device 110 may include a source electronic device 110 and electronic devices 120a-120c may include sink electronic devices. For example, source electronic device 110 may be an access point (AP) in WLAN or a source device in another source-sink scenario (e.g., in peer-to-peer communication applications.) In this example, source electronic device 110 may include, but is not limited to, WLAN electronic devices such as a wireless router, a wearable device (e.g., a smart watch), a wireless communication device (e.g., a smart phone), or a combination thereof. Network 130 may be the Internet and/or a WLAN.

Source electronic device 110 transmits multicast packets to members of multicast group 150 including electronic devices 120a-120c. The communication between source electronic device 110 and the members of multicast group 150 can take place using wireless communications 140a-140c. The wireless communications 140a-140c can be based on a wide variety of wireless communication techniques. These techniques can include, but are not limited to, techniques based on IEEE 802.11, IEEE 802.11v, IEEE 802.11ax, etc. standards.

According to some embodiments, source electronic device 110 and sink electronic devices 120 are configured to implement TWT for the multicast communication. Source electronic device 110 is configured to negotiate and/or define a specific time or a set of times for sink electronic devices 120 to access a medium. In one example, sink electronic device 120a transmits a request to source electronic device 110 to request for one or more multicast packets. According to some examples, the request can include a request for an individually addressed copy of the one or more multicast packets. Alternatively, the request can include a request for a multicast transmission of the one or more multicast packets. If source electronic device 110 has enough transmission capacity, source electronic device 110 may transmit a copy of the one or more multicast packets to sink electronic device 120a in response to the request from sink electronic device 120a. Source electronic device 110 can send the copy of the one or more multicast packets as individually addressed packet(s) to sink electronic device 120a, according to some embodiments.

If source electronic device 110 does not have enough transmission capacity, source electronic device 110 can configure a multicast communication with sink electronic device 120a in response to the request from sink electronic device 120a, according to some embodiments. Source electronic device 110 can also transmit a response to sink electronic device 120a indicating that sink electronic device 120a is a member of multicast group 150. The response from source electronic device 110 can also include a TWT element to implement the TWT scheme by source electronic device 110 and/or sink electronic device 120a. The TWT element within the response from source electronic device 110 to sink electronic device 120a indicates to sink electronic device 120a that sink electronic device 120a is a member of multicast TWT of source electronic device 110 and/or that sink electronic device 120a has an individual TWT agreement to receive and/or transmit multicast packets within the time(s) designated by the TWT element.

Figure 2:
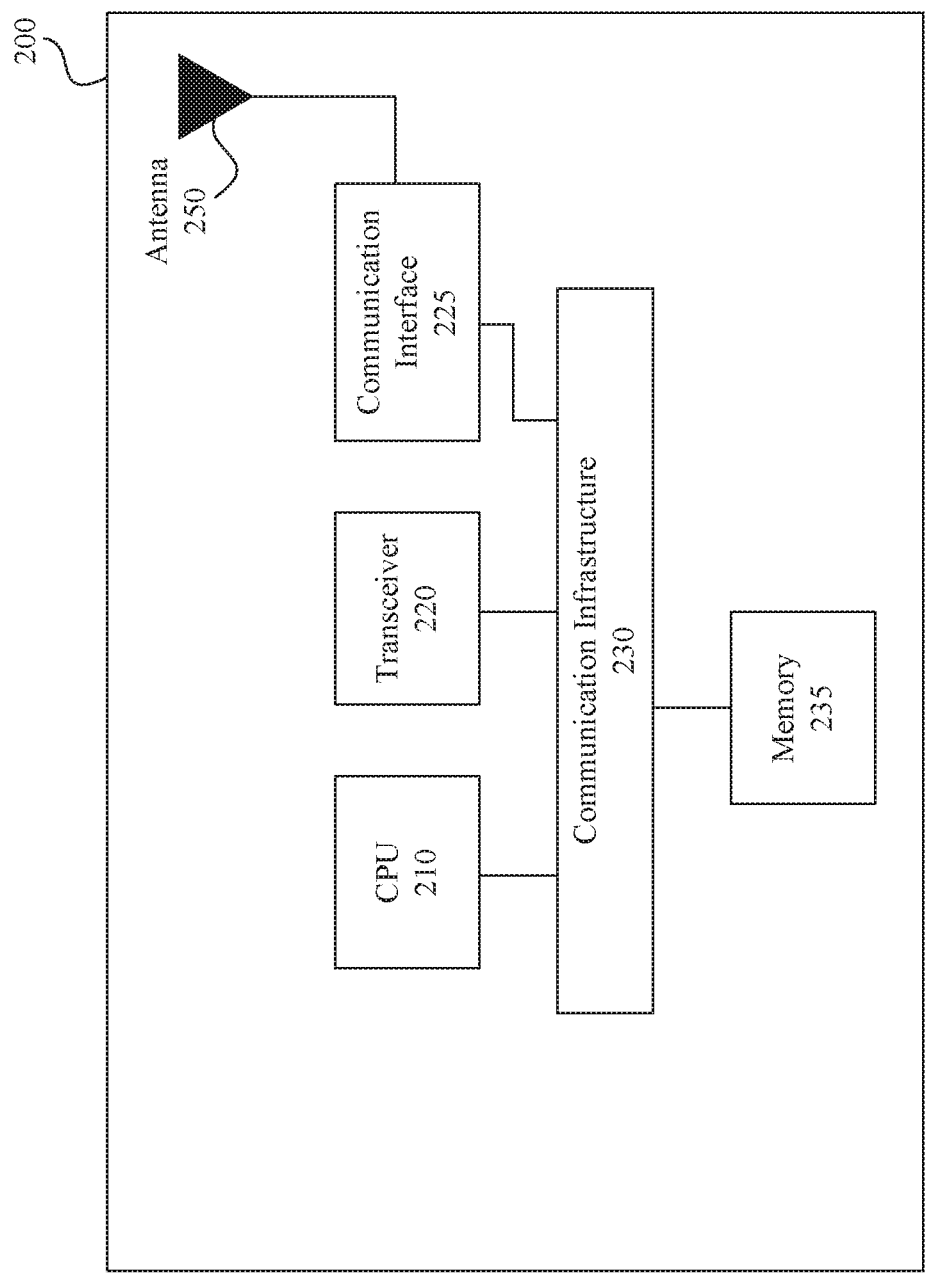
FIG. 2 illustrates a block diagram of an example wireless system of an electronic device implementing a multicast communication with TWT, according to some embodiments of the disclosure.

FIG. 2 illustrates a block diagram of an example wireless system 200 of an electronic device implementing a multicast communication with TWT, according to some embodiments of the disclosure. System 200 may be any of the electronic devices (e.g., electronic devices 110, 120) of system 100. System 200 includes central processing unit (CPU) 210, transceiver 220, communication interface 225, communication infrastructure 230, memory 235, and antenna 250. Memory 235 may include random access memory (RAM) and/or cache, and may include control logic (e.g., computer software) and/or data. CPU 210, can include one or more processors, that together with instructions stored in memory 235 performs operations enabling a wireless system 200 of a system 100 to implement a multicast communication with TWT. In some embodiments CPU 210 and instructions in memory 235 together perform operations enabling wireless system 200 of system 100. Transceiver 220 transmits and receives communications signals that support multicast communication with TWT functions according to some embodiments, and may be coupled to antenna 250. Communication interface 225 allows system 200 to communicate with other devices that may be wired and/or wireless. Communication infrastructure 230 may be a bus. Antenna 250 may include one or more antennas that may be the same or different types.

Figure 3A:
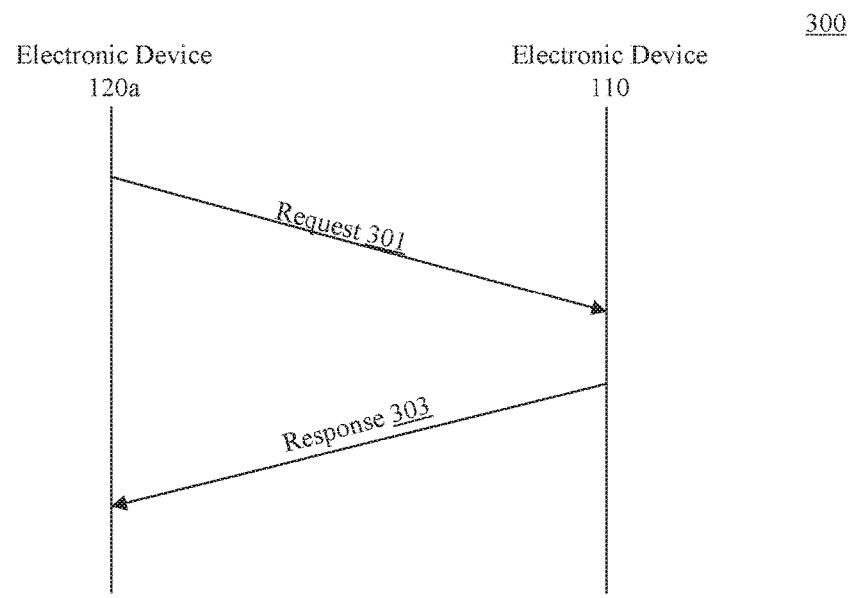
FIGS. 3A-3B illustrate example operations of communication between a sink electronic device and a source electronic device, according to some embodiments of the disclosure.
Figure 3B:
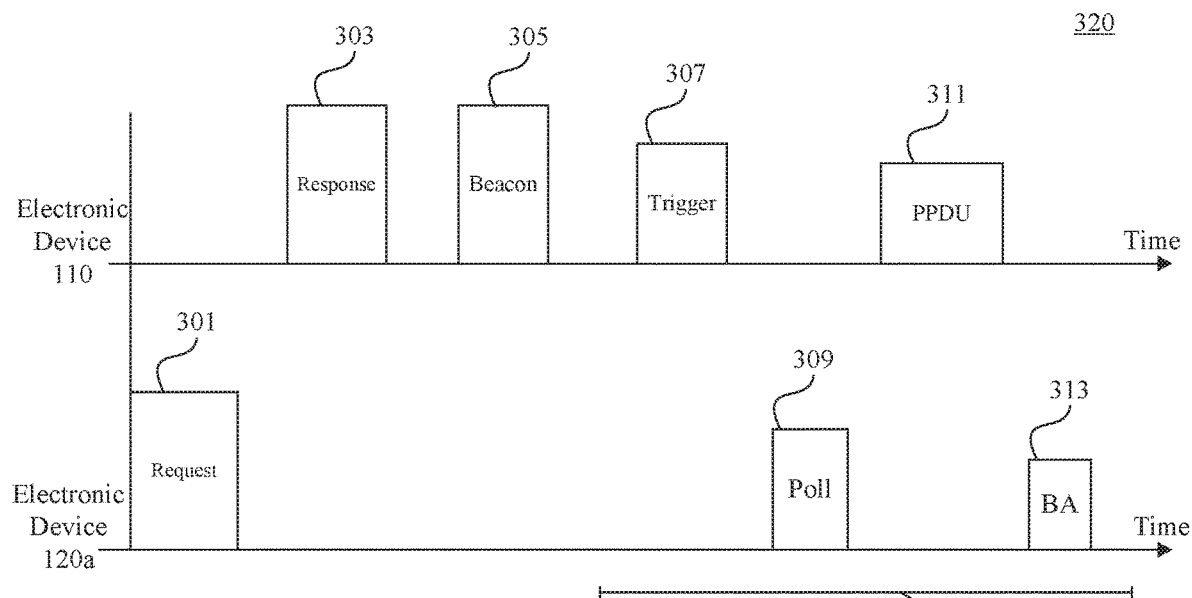

FIGS. 3A-3B illustrate example operations of communication between a sink electronic device and a source electronic device, according to some embodiments of the disclosure. FIGS. 3A-3B may be described with regard to elements of FIG. 1. Operation 300 of FIG. 3A and/or operation 320 of FIG. 3B may represent the communication between sink electronic device 120a and source electronic device 110.

According to some embodiments, sink electronic device 120a transmits request 301 to source electronic device 110 to request for one or more multicast packets. In some examples, request 301 can include a directed multicast service (DMS) request. According to some examples, request 301 can include a request for an individually addressed copy of the one or more multicast packets. Alternatively, request 301 can include a request for a multicast transmission of the one or more multicast packets. As discussed above, if source electronic device 110 has enough transmission capacity, source electronic device 110 may transmit a copy of the one or more multicast packets to sink electronic device 120a in response to the request from sink electronic device 120a. Source electronic device 110 can transmit the copy of the one or more multicast packets as individually addressed packet(s) to sink electronic device 120a, according to some embodiments. For example, response 303 from source electronic device 110 can include the copy of the one or more multicast packets as individually addressed packet(s), e.g., the copy of the one or more multicast packets are transmitted as unicast transmission.

If source electronic device 110 does not have enough transmission capacity, source electronic device 110 can configure a multicast communication with sink electronic device 120a in response to the request from sink electronic device 120a, according to some embodiments. For example, if sink electronic device 120a is not part of multicast group 150, source electronic device 110 can add sink electronic device 120a to multicast group 150. Source electronic device 110 can transmit response 303 to sink electronic device 120a indicating that sink electronic device 120a is a member of multicast group 150. Response 303 can also include the retransmission rule(s) supported by source electronic device 110 for this multicast group and/or for the transmission/retransmission of particular multicast packets. In other words, source electronic device 110 can inform sink electronic device 120a whether source electronic device 110 supports block acknowledgment (BA) for this multicast group and/or for the transmission/retransmission of particular multicast packets. If BA is supported, source electronic device 110 can inform sink electronic device 120a whether the retransmission(s) are multicast or unicast.

Response 303 can include a TWT element to implement the TWT scheme. According to some embodiments, sink electronic device 120a can negotiate with source electronic device 110 to configure the TWT schedule that is signaled in the TWT element of response 303. Additionally or alternatively, sink electronic device 120a can provide the TWT schedule to source electronic device 110 in its request 301 and source electronic device 110 can confirm the TWT schedule in the TWT element. Source electronic device 110 can confirm the TWT schedule as suggested by sink electronic device 120a in some examples or source electronic device 110 can confirm the TWT schedule with additional changes according to other examples. For example, request 301 can include a TWT element having a TWT schedule that is suitable for sink electronic device 120a and/or for its traffic. In another example, source electronic device 110 can configure the TWT schedule without any information from sink electronic device 120a. The TWT element within response 303 indicates to sink electronic device 120a that sink electronic device 120a is a member of multicast TWT of source electronic device 110 and/or that sink electronic device 120a has an individual TWT agreement to receive and/or transmit multicast packets within the time(s) designated by the TWT element.

According to some examples, the individual TWT agreement is a TWT agreement between source electronic device 110 and a sink electronic device (e.g., sink electronic device 120a) to use a TWT schedule individually tailored and/or transmitted to that sink electronic device (e.g., sink electronic device 120a) to use for multicast communication and the agreement parameters change may be done through individually addressed frames.

In addition to individual TWT agreements configured with individual sink electronic devices for multicast communication, source electronic device 110 can also set up a broadcast TWT schedule and advertise the broadcast TWT schedule to help TWT-capable devices conserve power usage during multicast communication. According to some embodiments, the broadcast TWT schedule is a TWT schedule broadcasted by source electronic device 110 to TWT-capable electronic devices such that the TWT-capable electronic devices can use the broadcast TWT schedule for multicast communication. In some examples, source electronic device 110 can advertise the broadcast TWT schedule in a beacon (e.g., beacon 305 of FIG. 3B.) Associated electronic devices (e.g., sink electronic devices 120) or unassociated electronic devices (e.g., electronic devices that are not associated with source electronic device 110 and/or are not part of a multicast group) can receive the broadcast TWT schedule and use the parameters of the broadcast TWT schedule to determine when to be awake to receive multicast packets from source electronic device 110. Source electronic device 110 transmits beacon 305 without receiving any request (e.g., request 301) from any electronic device, according to some embodiments. Additionally or alternatively, response 303 from source electronic device 110 can include the broadcast TWT schedule in response to receiving a request (e.g., request 301) from a sink electronic device.

In some examples, sink electronic device 120a can use request 301 to request for multicast packets that sink electronic device 120a missed. For example, if sink electronic device 120a does not receive one or more multicast packets that sink electronic device 120a was to receive based on the broadcast TWT schedule, sink electronic device 120a can use request 301 to further request for those multicast packets.

In addition to request 301, response 303, and beacon 305, operation 320 of FIG. 3B illustrates trigger frame 307, poll 309, physical layer convergence protocol data unit (PPDU) 311, block acknowledgment (BA) 313, and multicast service period 315. According to some embodiments, after establishing the TWT schedule for multicast communication through request 301 and response 303 and/or beacon 305, source electronic device 110 can send multicast packets to sink electronic device 110 during multicast service period 315. During multicast service period 315, source electronic device 110 is configured to send trigger frame 307 to sink electronic device 120a to determine if sink electronic device 120a has transitioned to awake mode for receiving PPDU 311, according to some embodiments. Sink electronic device 120a can respond to trigger frame 307 by transmitting poll frame 309 to indicate that sink electronic device 120a has transitioned to the awake mode. According to some embodiments, in response to poll 309, source electronic device 110 can transmit the multicast packets (e.g., PPDU 311) to sink electronic device 120a. In response to PDDU 311 and/or a block acknowledgment request within PPDU 311 or sent separately, sink electronic device 120a can transmit BA 313 and transition to sleep mode at the end of multicast service period 315.

Figure 4:
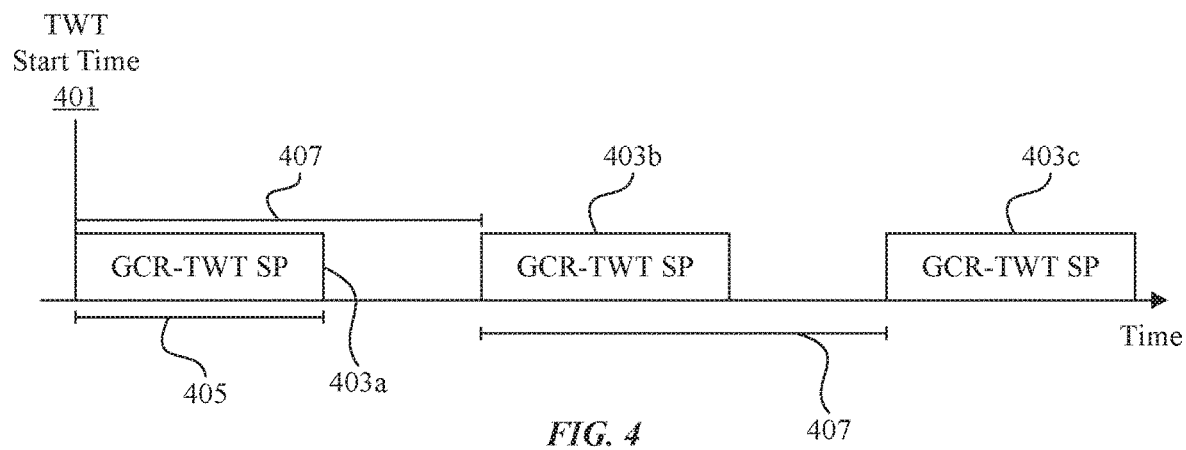
FIG. 4 illustrates an exemplary TWT flow for multicast communication, according to some embodiments of the disclosure.

FIG. 4 illustrates an exemplary TWT flow 400 for multicast communication, according to some embodiments of the disclosure. TWT flow 400 can be based on the TWT schedule (e.g., individual TWT agreement, broadcast TWT schedule) negotiated between a source electronic device and a sink electronic device. FIG. 4 may be described with regard to elements of FIG. 1.

TWT flow 400 includes TWT start time 401 that indicates when the TWT scheme for multicast communication starts, e.g., for sink electronic device 120a. TWT flow 400 further includes service periods 403a, 403b, 403c. Service periods 403 are the time windows where sink electronic device 120a will be awake because multicast packets may be transmitted during these service periods 403. The service periods 403 can have any time duration, such as time duration of 405. According to some examples, service periods 403a, 403b, 403c have the same time duration 405. Alternatively, service periods 403a, 403b, 403c can have different time durations. TWT flow 400 also includes repetition intervals 407. A repetition interval 407 may be the interval between the respective start times of consecutive service periods (e.g., the interval between the start time of service period 403a and the start time of service period 403b). When a TWT service period (SP) is not ongoing, sink electronic device 120a can be asleep or can perform other activities as sink electronic device 120a does not expect multicast packets from, for example, source electronic device 110.

FIGS. 5A-5D illustrate an exemplary TWT element format for implementing TWT for multicast communication, according to some embodiments of the disclosure. FIGS. 5A-5D may be described with regard to elements of FIGS. 1 and 3. The TWT element format illustrates the format of the TWT element transmitted by, for example, source electronic device 110 (and/or sink electronic device 120a) in, for example, response 303 and/or beacon 305 (in, for example, request 301).

Figure 5A:
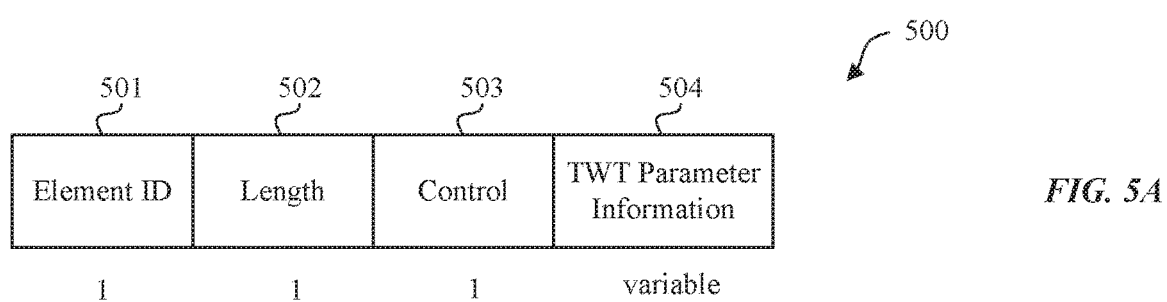

FIG. 5A illustrates TWT element 500. TWT element 500 can include any/all of different fields such as, but not limited to, element identifier (ID) 501, length 502, control 503, and TWT parameter information 504. The numbers under each field of TWT element 500 represent an exemplary size of the respective field of TWT element 500 in octets. TWT parameter information 504 can have different formats depending on whether TWT element 500 is associated with an individual TWT agreement or TWT element 500 is associated with a broadcast TWT schedule.

FIG. 5B illustrates the format of TWT parameter information 504a when TWT element 500 is used as the individual TWT agreement. FIG. 5C illustrates the format of TWT parameter information 504b when TWT element 500 is used as the broadcast TWT schedule. According to some embodiments, TWT parameter information 504a is used as the individual TWT agreement when a Broadcast field in control 503 is "0". In these examples, TWT parameter information 504b is used as the broadcast TWT schedule when the Broadcast field in control 503 is "1".

As illustrated in FIG. 5B, TWT parameter information 504a can include, but is not limited to, any/all of request type 511, target wake time 512, TWT group assignment 513, nominal minimum TWT wake duration 514, TWT wake interval mantissa 515, TWT channel 516, and optional null data packet (NDP) paging 517. The numbers under each field of TWT parameter information 504a represents exemplary size of the respective field of TWT parameter information 504a in octets. These fields of TWT parameter information 504a define and configure the TWT schedule for the implementing the TWT scheme for multicast communication between source electronic device 110 and sink electronic device 120a.

Regarding the broadcast TWT schedule, and as illustrated in FIG. 5C, TWT parameter information 504b can include, but is not limited to, any/all of request type 521, target wake time 522, nominal minimum TWT wake duration 523, TWT wake interval mantissa 524, and broadcast TWT information 525. The number under a field of TWT parameter information 504b represents an exemplary size of the respective field of TWT parameter information 504b in octets. These fields of TWT parameter information 504b define and configure the TWT schedule for the implementing the TWT scheme for multicast communication between source electronic device 110 and sink electronic device 120a. In this example, TWT parameter information 504b is associated with TWT element 500 used for communicating the broadcast TWT schedule to associated and/or unassociated TWT-capable sink electronic devices.

According to some embodiments, request type 511 of TWT parameter information 504a and/or request type 521 of TWT parameter information 504b can include one or more fields. For example, as illustrated in FIG. 5D, request type 511 and/or 521 can include, but is not limited to, any/all of TWT request subfield 531 (with length of, for example, 1 bit), TWT setup command subfield 532 (with length of, for example, 3 bits), trigger subfield 533 (with length of, for example, 1 bit), implicit subfield 534 (with length of, for example, 1 bit), flow type subfield 535 (with length of, for example, 1 bit), TWT flow identifier/broadcast TWT recommendation subfield 536 (with length of, for example, 3 bits), TWT wake interval exponent subfield 537 (with length of, for example, 5 bits), and TWT protection subfield 538 (with length of, for example, 1 bit). According to some examples, the TWT request subfield 531 of request type 511/521 can be set to "1" to indicate that TWT element 500 is being sent from a TWT requesting electronic device to a TWT responding electronic device (for example, TWT element 500 is part of request 301 of FIGS. 3A-3B.) The TWT request subfield 531 of request type 511/521 can be set to "0" to indicate that TWT element 500 is being sent from a TWT responding electronic device to a TWT requesting electronic device (for example, TWT element 500 is part of response 303 of FIGS. 3A-3B.)

According to some examples, TWT element 500 can be used to signal an individual TWT agreement to implement the TWT scheme for multicast communication. In these examples, TWT flow identifier 536 of request type 511 of TWT element 500 can be used to identify the individual TWT agreement. The source electronic device can use the same TWT flow identifier 536 for the individual TWT agreement with multiple sink electronic devices of the same multicast group for transmission of multicast packets. The individual TWT agreement can also include information regarding the retransmission mode(s) implemented by the source electronic device for this multicast group.

Additionally or alternatively, TWT element 500 can be used to signal broadcast TWT schedule to implement the TWT scheme for multicast communication. According to some examples, the broadcast TWT recommendation subfield 536 of request type 521 of TWT element 500 can be used to signal different types of multicast communication. Additionally, the broadcast TWT recommendation subfield 536 of request type 521 of TWT element 500 can be used to signal whether TWT element 500 is directed to one or more associated TWT-capable electronic devices and/or is directed to one or more unassociated TWT-capable electronic devices.

For example, the broadcast TWT recommendation subfield 536 of request type 521 of TWT element 500 can be set to a first value (for example, but not limited to, "4") to indicate that transmissions/retransmissions are for associated electronic devices and that the multicast communication can use any of a number of retransmission mechanisms. In this example, the broadcast TWT recommendation subfield 536 of request type 521 of TWT element 500 indicates that source electronic device is configured to transmit multicast packets with any of a number of retransmission mechanisms. In other words, the source electronic device may be configured to: retransmit all or a subset of multicast packets without using an acknowledgment scheme, retransmit all or a subset of multicast packets using block acknowledgment(s), or retransmit all or a subset of multicast packets using block acknowledgment where retransmissions are unicast transmissions.

As another example, broadcast TWT recommendation subfield 536 of request type 521 of TWT element 500 can be set to a second value (for example, but not limited to, "5") to indicate that transmissions/retransmissions are for associated electronic devices and that the multicast communication can use retransmission, but does not use acknowledgments. In this example, the broadcast TWT recommendation subfield 536 of request type 521 of TWT element 500 indicates that source electronic device is configured to transmit multicast packets with retransmission, but the source electronic device does not use an acknowledgment scheme. In other words, the source electronic device is configured to retransmit all or a subset of multicast packets without using acknowledgment scheme.

According to some embodiments, when broadcast TWT recommendation subfield 536 of request type 521 of TWT element 500 is set to the second value (e.g., "5"), the beacon (e.g., beacon 305 of FIG. 3B) and/or response transmitted by the source electronic device (e.g., response 303 of FIGS. 3A-3B) to transmit TWT element 500 can also include the group media access control (MAC) addresses. The group MAC addresses can include the MAC addresses of the sink electronic devices within the multicast group associated with TWT element 500. According to some examples, the beacon and/or response include an additional element for the group MAC addresses. Additionally or alternatively, TWT element 500 can include an additional field for the group MAC addresses.

The source electronic device can change the value of TWT recommendation subfield 536 depending on changes in retransmission modes. For example, the source electronic device may change the value of TWT recommendation subfield 536, for example, from "4" to "5" or from "5" to "4". When the source electronic device changes the value of TWT recommendation subfield 536 from "4" to "5", the source electronic device is signaling that the retransmission mode is changed to retransmission without acknowledgments. According to some examples, before the change occurs, the source electronic device may transmit unicast responses (e.g., responses 303 of FIGS. 3A-3B such as unicast directed multicast service (DMS) responses) to the sink electronic devices so that the sink electronic devices can update the retransmission mode.

When the source electronic device changes the value of TWT recommendation subfield 536 from "5" to "4", a sink electronic device that has not transmitted a request (e.g., request 301 of FIGS. 3A-3B such as a DMS request) to receive multicast packets can transmit the request to the source electronic device to indicate that the sink electronic device is receiving the packets. In some examples, the retransmission mode of this sink electronic device changes when this sink electronic device receives a response (e.g., response 303 of FIGS. 3A-3B such as a DMS response) from the source electronic device.

According to some embodiments and as discussed above, the source electronic device (e.g., source electronic device 110) is configured to implement the TWT scheme for multicast communication with unassociated electronic devices (e.g., electronic devices that are not associated with source electronic device 110 and/or are not part of a multicast group). To do so, the source electronic device is configured to set up broadcast TWT schedule and transmit the broadcast TWT schedule using a beacon (e.g., beacon 305 of FIG. 3B), according to some embodiments. In some examples, the multicast packets that are transmitted during the TWT service periods by, for example, the source electronic device can be non-encrypted such that the unassociated electronic devices can also be able to receive and decode these packets. Additionally or alternatively, the multicast packets can use higher than MAC layer encryption mechanisms and/or application specific encryption mechanisms. TWT element 500 can be configured for the cases where TWT element 500 is used for broadcast TWT schedule for unassociated electronic devices For example, the broadcast TWT recommendation subfield 536 of request type 521 of TWT element 500 can be set to a third value (for example, but not limited to, "6") to indicate that transmissions/retransmissions are for unassociated electronic devices and that the multicast communication can use any retransmission mechanisms. In this example, the broadcast TWT recommendation subfield 536 of request type 521 of TWT element 500 indicates that source electronic device is configured to transmit multicast packets with any retransmission mechanism. In other words, the source electronic device is configured to: retransmit all or a subset of multicast packets without using an acknowledgment scheme, retransmit all or a subset of multicast packets using block acknowledgment(s), or retransmit all or a subset of multicast packets using block acknowledgment where retransmissions are unicast transmissions.

As another example, the broadcast TWT recommendation subfield 536 of request type 521 of TWT element 500 can be set to a fourth value (for example, but not limited to, "7") to indicate that transmissions/retransmissions are for unassociated electronic devices and that the multicast communication can use retransmission but does not use acknowledgments. In this example, the broadcast TWT recommendation subfield 536 of request type 521 of TWT element 500 indicates that the source electronic device is configured to: transmit multicast packets with retransmission, but the source electronic device does not use acknowledgment scheme. In other words, the source electronic device is configured to retransmit all or a subset of multicast packets without using an acknowledgment scheme.

According to some embodiments, in addition to indicating that the source electronic device offers multicast communication with unassociated electronic devices, the source electronic device may broadcast one or more MAC addresses from which the multicast packets may be transmitted. In this example, the associated and/or unassociated sink electronic devices may know from which internet protocol (IP) address desired data is transmitted. The associated and/or unassociated electronic devices may have, or have access to, an IP address-MAC address mapping to select the multicast packets from the desired MAC address. Additionally, the unassociated electronic devices may be configured to use directed multicast service (DMS) requests for delivery of multicast packets and may be able to setup block acknowledgment scheme using, for example, Add Block Acknowledgment (ADDBA) request/response frames. In some examples, the source electronic device is configured to use, for example, block acknowledgment schemes to test an unassociated electronic devices to determine whether the unassociated electronic devices is available to receive multicast packets and/or to determine whether the unassociated electronic device correctly receives the multicast packets.

Figure 6A:
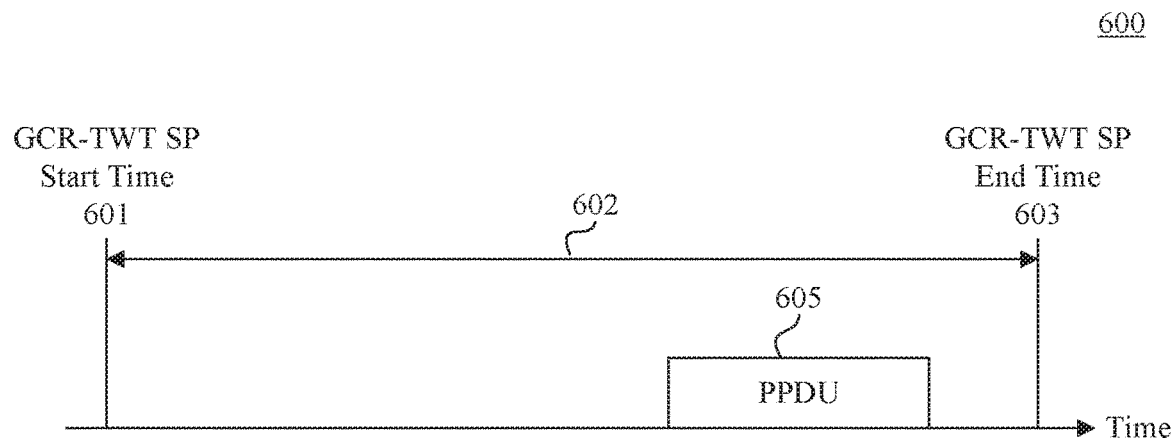
FIGS. 6A-6B illustrate two example implementations for transmission of multicast packets within a multicast service period, according to some embodiments of the disclosure.
Figure 6B:
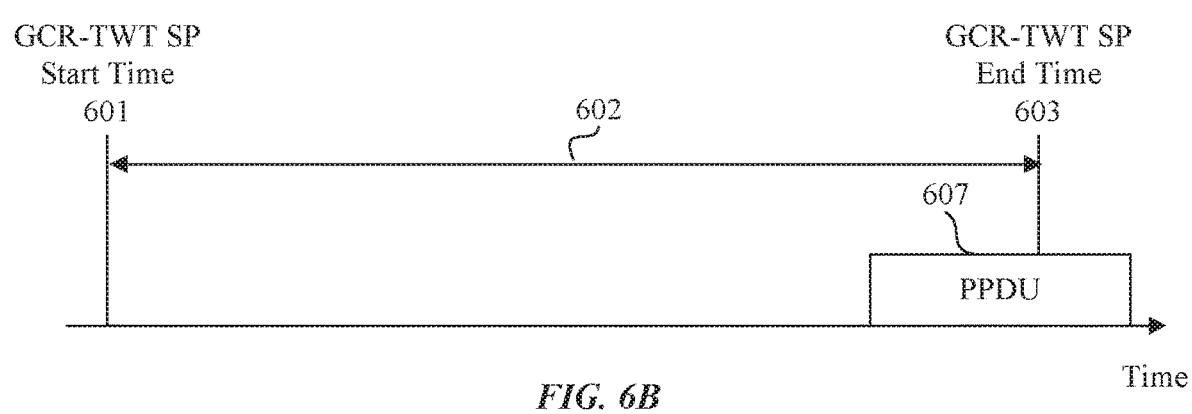

FIGS. 6A-6B illustrate two example implementations for transmission of multicast packets within a multicast service period, according to some embodiments of the disclosure.

Operation 600 of FIG. 6A illustrates a first implementation. Multicast service period 602 has a start time 601 and an end time 603. Multicast service period 602 is similar to service periods 403 of FIG. 4. In operation 600, the multicast packets, including physical layer convergence protocol data unit (PPDU) 605 are transmitted within multicast service period 602. Operation 610 of FIG. 6B illustrates a second implementation. Multicast service period 602 has a start time 601 and an end time 603. Multicast service period 602 is similar to service periods 403 of FIG. 4. In operation 610, the transmission of the multicast packets, including PPDU 607 starts within multicast service period 602.

Early termination mechanisms can be used to trigger the sink electronic devices to transition to sleep mode earlier than planned and/or terminate multicast service periods earlier than planned. For example, as illustrated in more detail below, End of Service Period (EOSP) field and/or More Data field in media access control (MAC) headers of MAC protocol data units (MPDUs) of PPDUs can be used for the early termination mechanisms. Additionally or alternatively, trigger frames (e.g., trigger frame 307 of FIG. 3B) can be used for the early termination mechanisms. For example, a trigger frame can include an additional field such as multicast Cascade Indication field (e.g., GCR-Cascade Indication field) used for the early termination mechanisms. In this example, the added multicast Cascade Indication field can be set to a first value (e.g., "1") to signal the termination of multicast service periods.

Figure 7:
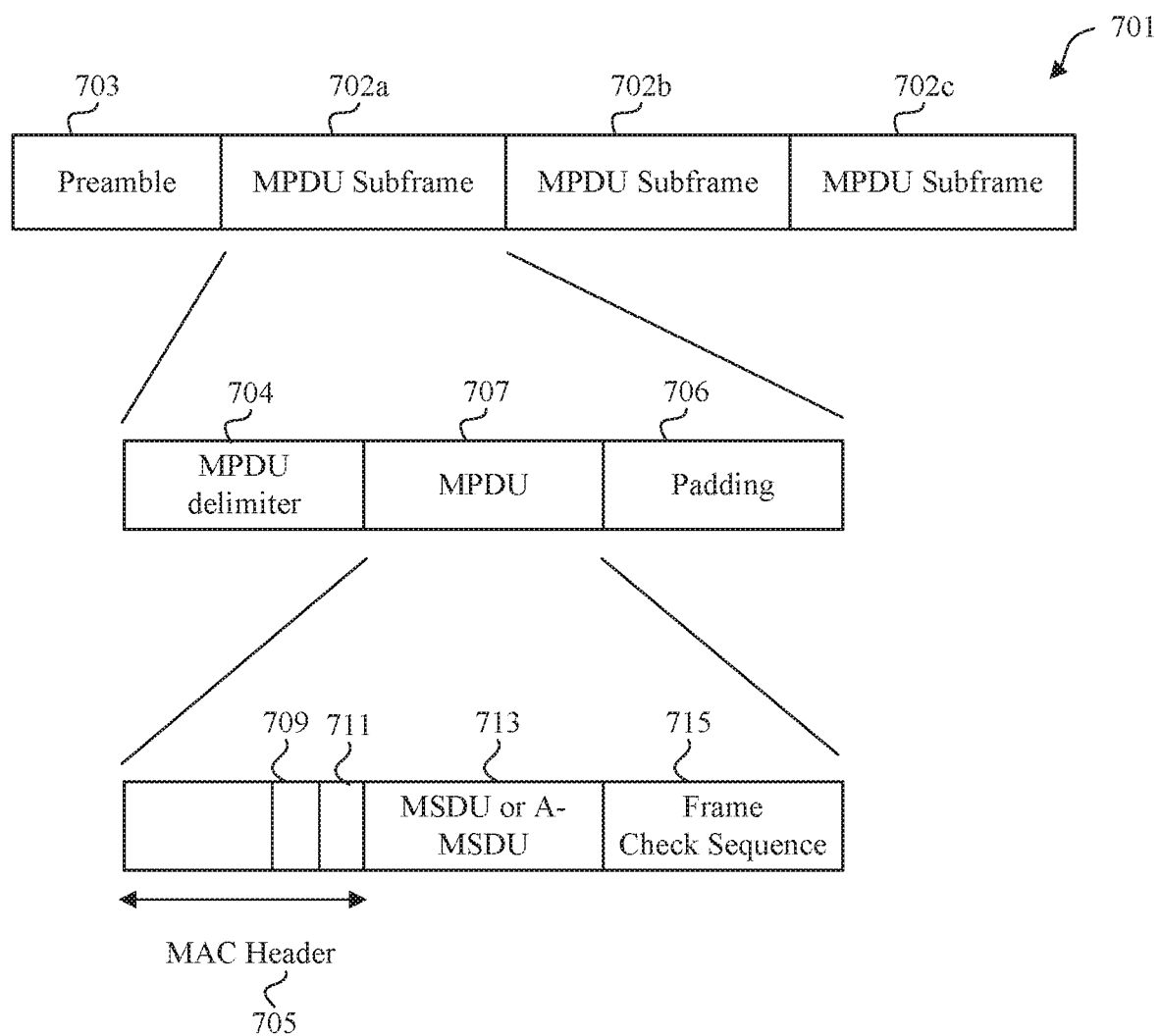
FIG. 7 illustrates an example frame format, according to some embodiments of the disclosure.

FIG. 7 illustrates an example frame format, according to some embodiments of the disclosure. For example, FIG. 7 illustrates an exemplary format of PPDU 701. PPDU 701 can include PPDU 605 and 607 of FIGS. 6A-6B or other PPDUs discussed herein, according to some examples. PPDU 701 includes one or more MAC protocol data unit (MPDU) subframes 702a-c and preamble 703. Preamble 703 can include a physical layer preamble and/or physical layer header. Preamble 703 can include information used for carrier acquisition, synchronization, channel estimation, communicating frame specific parameters (e.g., coding rate, frame length, etc.), or other purposes.

MPDU subframe 702 can include fields such as, but not limited to, MPDU delimiter 704, MPDU 707, and padding 706. MPDU delimiter 704 can include information on MPDU length, cyclic redundancy checks (CRC), and/or a unique pattern. Padding 706 can include frame check sequence (FCS) for error-detection and/or additional padding (e.g., 0 to 3 bytes) to compensate for different lengths of different MPDUs. MPDU 707 can include media access control (MAC) header 705, MAC service data unit (MSDU) and/or aggregated MSDU (A-MDSU) 713, and frame check sequence (FCS) 715, according to some embodiments. If MPDU 707 includes A-MSDU 713, A-MSDU 713 can include one or more A-MSDU subframes, where each A-MSDU subframe can include an A-MSDU subframe header, an MSDU, and a padding, according to some embodiments. PPDU 701 can be used to transmit multicast packets during multicast service periods. According to some examples, the multicast packets are encoded within one or more MPDUs 707.

In some examples MAC header 705 can include More Data field 709 and End of Service Period (EOSP) field 711. According to some examples, by setting EOSP field 711 of PPDU 701 to a first value (e.g., "1"), the source electronic device can signal to the sink electronic device that that PPDU 701 is the last transmitted PPDU in the multicast service period and no more PPDUs are transmitted in this multicast service period. Accordingly, the sink electronic device can enter the sleep mode when the sink electronic device receives PPDU 701 with EOSP field 711 set to the first value (e.g., "1") or after the sink electronic device has sent its acknowledgment of PPDU 701 (if the source electronic device requested for acknowledgment.) More Data field 709 and EOSP field 711 are discussed in more detail below.

MAC header 705 can include other fields such as, but not limited to, frame control, duration field, address(es), sequence control, and QoS control as understood by a person of ordinary skills in art. It is noted that frame format of PPDU 701 is provided as one example, and the embodiments of this disclosure are not limited to this example.

Figure 8A:
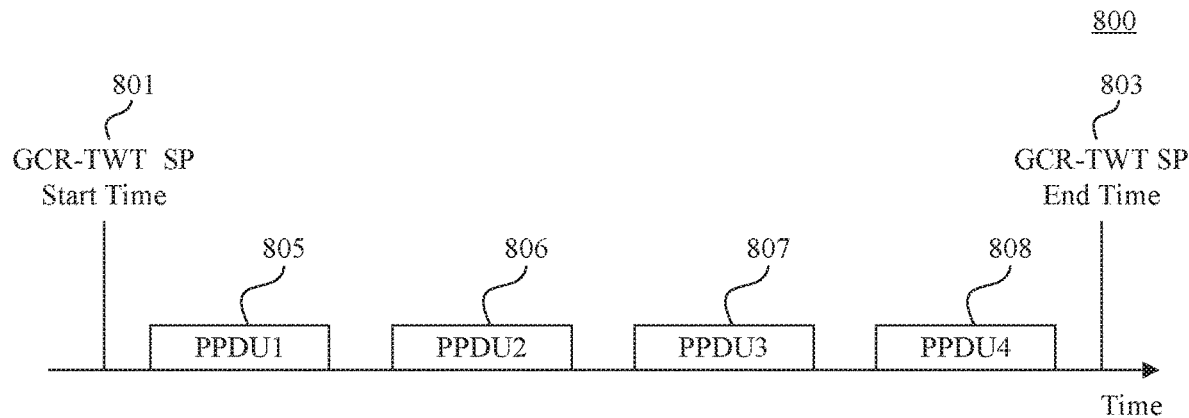
FIGS. 8A-8C illustrate exemplary operations of a source electronic device implementing TWT scheme with multicast communication, according to some embodiments of the disclosure.
Figure 8B:
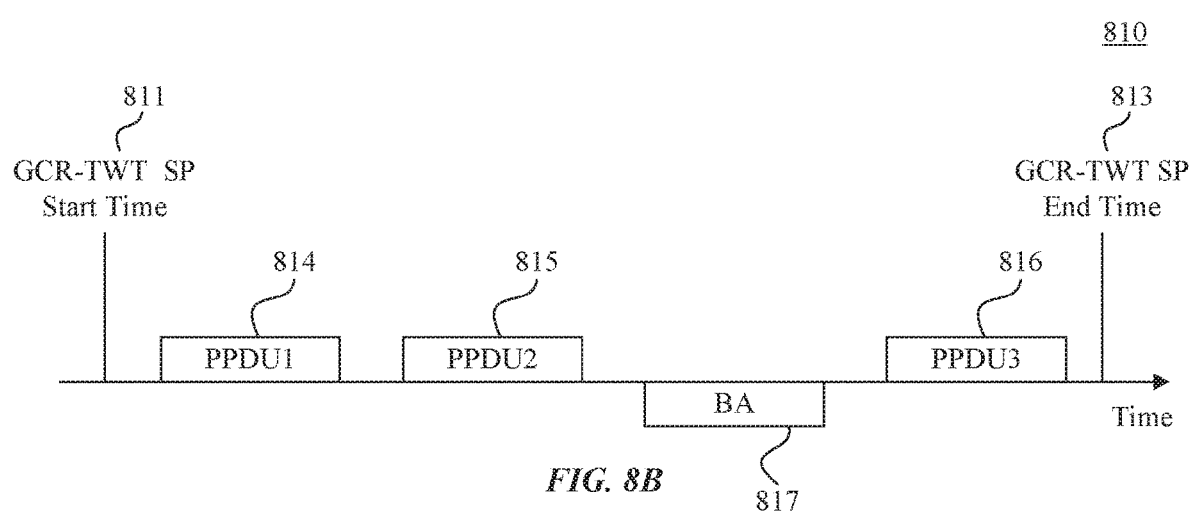
Figure 8C:
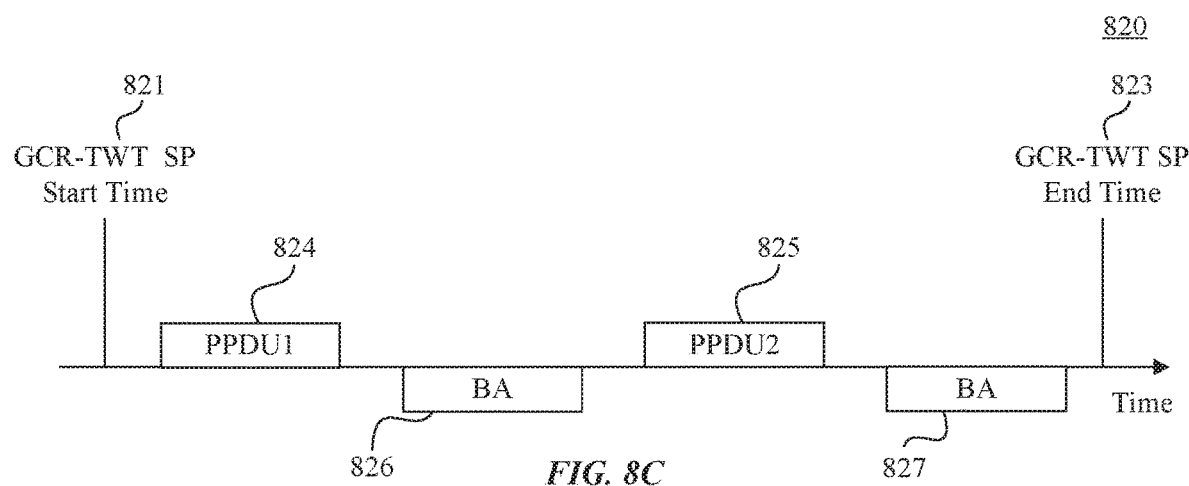

FIGS. 8A-8C illustrate exemplary operations of a source electronic device implementing TWT scheme with multicast communication, according to some embodiments of the disclosure. As a convenience and not a limitation, these exemplary operations are discussed with respect to FIGS. 1 and 7.

FIG. 8A illustrates an exemplary operation 800 of a source electronic device implementing TWT scheme with multicast communication where the multicast communication uses retransmissions without acknowledgment retransmission rules. In other words, in the exemplary operation 800, the source electronic device does not request acknowledgements from sink electronic devices. But the source electronic device is configured to retransmit all or a subset of multicast packets to all or a subset of sink electronic devices.

As illustrated in FIG. 8A, a multicast service period is defined by multicast service period start time 801 and multicast service period end time 803. The source electronic device is configured to transmit and/or retransmit PPDUs 805-808 within the multicast service period. It is noted that although these examples are discussed with respect to the source electronic device transmitting and/or retransmitting PPDUs 805-808, these PPDUs can also be transmitted and/or retransmitted by one or more sink electronic devices.

According to some embodiments, the source electronic device may set More Data field (e.g., More Data field 709) in the MAC headers of MPDUs of a PPDU to a first value (e.g., "1") to indicate that during the remainder of the multicast service period the source electronic device will transmit one or more MPDUs addressed to the multicast group for the first time (e.g. new MPDUs). For example, the source electronic device sets the More Data field of one or more MPDUs of PPDU 805 to "1" indicating that the following PPDU 806 includes one or more MPDUs that have not yet been transmitted. The sink electronic devices of the multicast group can check the More Data field of the received MPDUs and stay awake if the More Data field is set to the first value (e.g., "1") to be able to receive the new MPDUs.

Alternatively, the source electronic device may set More Data field (e.g., More Data field 709) in the MAC headers of MPDUs of a PPDU to a second value (e.g., "0") to indicate that during the remainder of the multicast service period the source electronic device will only retransmit one or more MPDUs addressed to the multicast group that have previously been transmitted. For example, the source electronic device sets the More Data field of one or more MPDUs of PPDU 806 to "0" indicating that the following PPDUs (e.g., PPDUs 807 and 808) include no new MPDUs but only retransmitted MPDUs. In this example, PPDUs 807 and 808 include retransmissions of already transmitted MPDUs. By checking the More Data field of the received MPDUs, one or more sink electronic devices of the multicast group that have already received the MPDUs can transition to sleep mode during the remainder of the multicast service period. According to some examples, the sink electronic device is configured to keep a record of transmitted and received MPDUs. Therefore, when the sink electronic device determines that it has received all transmitted MPDUs within the multicast service period, the sink electronic device can transition to sleep mode for the remainder of that multicast service period.

Further, as discussed above, the source electronic device can set the EOSP field (ESOP field 711) in the MAC headers of the MPDUs of the last PPDU to a first value (e.g., "1") to indicate to the sink electronic devices that this PPDU is the last PPDU and no more multicast packets are transmitted during the remainder of this multicast service period. For example, the source electronic device sets the EOSP field in the MPDUs of PPDU 808 to "1" to indicate that no more multicast packets are transmitted within the remainder of this multicast service period. By checking that the EOSP field of PPDU 808 is set to "1", one or more sink electronic devices of the multicast group can transition to sleep mode during the remainder of the multicast service period.

FIG. 8B illustrates an exemplary operation 810 of a source electronic device implementing TWT scheme with multicast communication where the multicast communication uses multicast retransmissions with block acknowledgment. In other words, in the exemplary operation 810, the source electronic device can request for block acknowledgements from sink electronic devices and the retransmissions are multicast retransmissions.

As illustrated in FIG. 8B, a multicast service period is defined by multicast service period start time 811 and multicast service period end time 813. The source electronic device is configured to transmit and/or retransmit PPDUs 814-816 within the multicast service period. It is noted that although these examples are discussed with respect to the source electronic device transmitting and/or retransmitting PPDUs 814-816, these PPDUs can also be transmitted and/or retransmitted by one or more sink electronic devices. FIG. 8B also illustrates block acknowledgment (BA) 817 transmitted from one or more sink electronic device. Although not shown, operation 810 of the source electronic device can also include one or more requests for BA transmitted by the source electronic device. In other words, the source electronic device can be configured to transmit BA request(s) (BAR) to one or more sink electronic devices (e.g., before the sink electronic devices transmit BA 817) to ask the sink electronic devices for BA.

According to some embodiments, the source electronic device may set More Data field (e.g., More Data field 709) in the MAC headers of MPDUs of a PPDU to a first value (e.g., "1") to indicate that during the remainder of the multicast service period the source electronic device will transmit one or more MPDUs addressed to the multicast group for the first time. Additionally or alternatively, the source electronic device may set the More Data field to "1" to indicate that during the remainder of the multicast service period the source electronic device will request BA for the first time from one or more sink electronic devices (e.g., the source electronic device will transmit BAR for the first time for one or more sink electronic devices.) For example, the source electronic device sets the More Data field of one or more MPDUs of PPDU 814 to "1" indicating that the following PPDU 815 includes one or more MPDUs that have not yet been transmitted or the source electronic device may request BA from one or more sink electronic devices for the first time. The sink electronic devices of the multicast group can check the More Data field of the received MPDUs and stay awake if the More Data field is set to the first value (e.g., "1") to be able to receive the new MPDUs or to transmit possible requested BAs.

Alternatively, the source electronic device may set More Data field (e.g., More Data field 709) in the MAC headers of MPDUs of a PPDU to a second value (e.g., "0") to indicate that during the remainder of the multicast service period the source electronic device will only retransmit one or more MPDUs addressed to the multicast group. Additionally or alternatively, the source electronic device may set the More Data field to "0" to indicate that during the remainder of the multicast service period the source electronic device will request BA from one or more sink electronic devices that have missed previously transmitted MPDUs during this multicast service period. The source electronic device is configured to determine the sink electronic device that has missed previously transmitted MPDUs based on the BAs that the source electronic device has previously received. For example, the source electronic device sets the More Data field of one or more MPDUs of PPDU 815 to "0" indicating that the following PPDUs (e.g., PPDU 816) include no new MPDUs but only retransmitted MPDUs or that the following PPDU 816 includes no new request for BA but may include request(s) for BA from sink electronic devices that have missed one or more MPDUs. In this example, PPDU 816 includes retransmissions of already transmitted MPDUs.

By checking the More Data field of the received MPDUs, one or more sink electronic devices of the multicast group that have already received the MPDUs and no BA is requested from them can transition to sleep mode during the remainder of the multicast service period. However, if a sink electronic device of the multicast group receives a BA request in PPDU 815, this sink electronic device can send BA 817 to the source electronic device. If this sink electronic device has correctly received the MPDUs, this sink electronic device can then transition to the sleep mode after transmitting BA 817.

The source electronic device can set the EOSP field (ESOP field 711) in the MAC headers of the MPDUs of the last PPDU to a first value (e.g., "1") to indicate to the sink electronic devices that this PPDU is the last PPDU and no more multicast packets are transmitted during the remainder of this multicast service period. For example, the source electronic device sets the EOSP field in the MPDUs of PPDU 816 to "1" to indicate that no more multicast packets are transmitted within the remainder of this multicast service period. By checking that the EOSP field of PPDU 816 is set to "1", one or more sink electronic devices of the multicast group can transition to sleep mode during the remainder of the multicast service period.

FIG. 8C illustrates an exemplary operation 820 of a source electronic device implementing TWT scheme with multicast communication where the multicast communication uses unicast retransmissions with block acknowledgment. In other words, in the exemplary operation 820, the source electronic device can request for block acknowledgements from sink electronic devices and the retransmissions are unicast retransmissions.

As illustrated in FIG. 8C, a multicast service period is defined by multicast service period start time 821 and multicast service period end time 823. The source electronic device is configured to transmit PPDUs 824-825 within the multicast service period. It is noted that although these examples are discussed with respect to the source electronic device transmitting PPDUs 824-825, these PPDUs can also be transmitted by one or more sink electronic devices. FIG. 8C also illustrates block acknowledgments (BAs) 826-827 transmitted from one or more sink electronic devices. Although not shown, operation 820 of the source electronic device can also include one or more requests for BA transmitted by the source electronic device. In other words, the source electronic device can be configured to transmit BA request(s) (BAR) to one or more sink electronic devices (e.g., before the sink electronic devices transmit BAs 826-827) to ask the sink electronic devices for BA.

According to some embodiments, the source electronic device may set More Data field (e.g., More Data field 709) in the MAC headers of MPDUs of a PPDU to a first value (e.g., "1") to indicate that during the remainder of the multicast service period the source electronic device will transmit one or more MPDUs addressed to the multicast group for the first time. Additionally or alternatively, the source electronic device may set the More Data field to "1" to indicate that during the remainder of the multicast service period the source electronic device will request BA for the first time from one or more sink electronic devices (e.g., the source electronic device will transmit BAR for the first time from one or more sink electronic devices.) For example, the source electronic device sets the More Data field of one or more MPDUs of PPDU 824 to "1" indicating that the following PPDU 825 includes one or more MPDUs that have not yet been transmitted or the source electronic device may request BA from one or more sink electronic devices for the first time. The sink electronic devices of the multicast group can check the More Data field of the received MPDUs and stay awake if the More Data field is set to the first value (e.g., "1") to be able to receive the new MPDUs or to transmit possible requested BAs. In some examples, PPDU 824 can include and/or be followed with BAR from one or more sink electronic devices. The sink electronic devices that receive the BAR respond with BA 826. The source electronic device receives BA 825 and if the source electronic device determines from BA 825 that a sink electronic device failed to receive at least part of PPDU 824, the source electronic device transmits a unicast copy of the at least part of PPDU 824 to that sink electronic device. In this example, the multicast packets are not retransmitted during the multicast service period.

Alternatively, the source electronic device may set More Data field (e.g., More Data field 709) in the MAC headers of MPDUs of a PPDU to a second value (e.g., "0") to indicate that during the remainder of the multicast service period the source electronic device will not transmit more MPDUs addressed to the multicast group and the source electronic device will not request BAs from the sink electronic devices in any following PPDUs. For example, the source electronic device sets the More Data field of one or more MPDUs of PPDU 825 to "0" indicating that no more MPDUs addressed to the multicast group will be transmitted. PPDU 825 can include and/or be followed with BAR from one or more sink electronic devices. The sink electronic devices that receive the BAR respond with BA 827.

The source electronic device can set the EOSP field (ESOP field 711) in the MAC headers of the MPDUs of the last PPDU to a first value (e.g., "1") to indicate to the sink electronic devices that this PPDU is the last PPDU and no more multicast packets are transmitted during the remainder of this multicast service period. For example, the source electronic device sets the EOSP field in the MPDUs of PPDU 825 to "1" to indicate that no more multicast packets are transmitted with the remainder of this multicast service period. By checking that the EOSP field of PPDU 825 is set to "1", one or more sink electronic devices of the multicast group can transition to sleep mode during the remainder of the multicast service period.

According to some embodiments, trigger frame(s) (e.g., trigger frame 307 of FIG. 3B) transmitted by the source electronic device can also be used for early termination mechanisms to trigger the sink electronic devices to transition to sleep mode earlier than planned and/or terminate multicast service periods earlier than planned. The trigger frame can include an additional field such as multicast Cascade Indication field (e.g., GCR-Cascade Indication field) used for the early termination mechanisms, according to some embodiments. For example, the added multicast Cascade Indication field can be set to a first value (e.g., "1") to signal the termination of multicast service periods. If the trigger frame indicates the termination of the multicast service period, the triggered sink electronic device may transition to the sleep mode after the triggered sink electronic device transmits it block acknowledgment. The other sink electronic devices (e.g., the sink electronic devices that were not triggered to send block acknowledgments) may transition to the sleep mode after receiving the trigger frame.

The trigger frame transmitted by the source electronic device can be part of a block acknowledge request (BAR) transmitted by the source electronic device, according to some examples. The BAR is transmitted by the source electronic device to request all or a subset of the sink electronic devices to send acknowledgment(s) of the received multicast packets. According to some examples, although not shown, the BAR can be transmitted after PPDU 815 and before BA 816 of FIG. 8B, after PPDU 824 and before BA 826 of FIG. 8C, or after PPDU2 and before BA 827 of FIG. 8C.

According to some embodiments, multicast packets transmitted during the multicast service period can be associated with one group address or different group addresses. The MPDUs within the PPDUs transmitted during the multicast can include and/or be associated with a capability field. The capability field can be included in, for example, a Beacon, Association or other MAC layer management frames. If the capability field of a PPDU is set to a first value (e.g., "0"), the source electronic device indicates that the MPDUs of a PPDU may be associated with one or more group addresses, and the MPDUs of that PPDU have the same More Data field. In this example, a More Data field set to a first value (e.g., "0") may signal that MPDUs from all group addresses have been transmitted once in the corresponding multicast service period, and any MPDUs in that multicast service period are retransmissions.

If the capability field is set to a second value (e.g., "1"), the source electronic device indicates that the MPDUs of a PPDU may be associated with one or more group addresses, and the More Date field is MPDU specific (e.g., a PPDU may carry MPDUs with different More Data field values to different group addresses.) In this example, a More Data field set to a first value (e.g., "0") may signal that MPDUs associated to a specific group address have been transmitted once in the corresponding multicast service period. Additionally or alternatively, a new bit or a new field in the MAC header may be set to a second value (e.g., "1") to signal that MPDUs from all group addresses are transmitted once in the corresponding multicast service period.

According to some embodiments, the source electronic device can be configured to prioritize the transmission and/or retransmission of multicast packets depending on different parameters. In one example, when the source electronic device is transmitting multicast packets in multicast service periods and at least one of the sink electronic devices operates in a power save mode, the source electronic device is configured to transmit the multicast packets before any retransmission. Therefore, the sink electronic device in the power save mode can transition to sleep mode after it has received all desired packets, improving its power save performance and reducing delays. In some examples, using request 301 of FIGS. 3A-3B (or other requests), the sink electronic device can inform the source electronic device that the sink electronic device is operating in the power save mode. During transmission of multicast packets, the source electronic device is configured to determine whether any sink electronic devices operates in a power save mode. In response to a determination that at least one of the sink electronic devices operates in the power save mode, the source electronic device is configured to transmit the multicast packets before any retransmission.

In some embodiments, if the source electronic device, during a multicast service period, transmits multicast packets associated with different group addresses, the source electronic device can be configured to first transmit the multicast packets associated with the group address, which most sink electronic devices have requested to receive. For example, when receiving requests (e.g., request 301 of FIGS. 3A-3B or other requests) for multicast packets, the source electronic device is configured to determine whether the sink electronic devices request for multicast packets associated with different group addresses. The source electronic device is configured to keep a record of the different group addresses and the number of sink electronic devices requesting each one of the different group addresses. During the transmission of the multicast packets during a multicast service period, the source electronic device is configured to determine which ones of the different group addresses have multicast packets for transmission and the number of sink electronic devices for those ones of the different group addresses. The source electronic device is further configured to determine the multicast packets associated with the group address that most of the sink electronic devices have requested and to transmit those multicast packets.

FIGS. 9A-9B illustrate an exemplary neighbor report element format, according to some embodiments of the disclosure. FIGS. 9A-9B may be described with regard to elements of FIGS. 1 and 3A-3B.

As discussed above, source electronic device 110 can include an access point (AP), in some embodiments. AP 110 can be a multiband AP operating at multiple frequency bands. These frequency bands can include, but are not limited to, 2.4 GHz band, 5 GHz band, 6 GHz band, 60 GHz band, etc. AP 110 can be configured to balance traffic in different basic service sets (BSS) by requesting that the associated electronic devices (e.g., electronic devices 120a-b) to change their associated BSS to other frequency bands.

Also, when an unassociated electronic device (e.g., electronic device 120c) wants to discover and associate with AP 110, electronic device 120c can determine in which channels (e.g., frequency bands) AP 110 operates and electronic device 120c can be configured to determine and select the channel that is most suitable for electronic device 120c to associate with AP 110. AP 110 can be configured to use a neighbor report element in a beacon (e.g., beacon 305 of FIG. 3B) and/or a response (e.g., response 303 of FIGS. 3A-3B) to communicate to electronic device 120c other channels that AP 110 is operating on. According to some examples, electronic device 120c can be configured to select the channel most suitable for electronic device 120c. Additionally or alternatively, AP 110 can recommend to electronic device 120c the channel most suitable for electronic device 120c.

FIG. 9A illustrates neighbor report element 900. Neighbor report element 900 can include different fields such as, but not limited to, element identifier (ID) 901, length 902, BSS identifier (BSSID) 903, BSSID information 904, operating class 905, channel number 906, PHY type 907, and optional subelements 908. The number under each field of neighbor report element 900 represent exemplary size of the respective field of neighbor report element 900 in bits. Neighbor report element 900 provides multiple BSS information and capabilities and can help the electronic device 120c to select a BSS for association.

According to some embodiments, neighbor report element 900 can be used within system 100 for multicast communication. In other words, multiband AP 110 can use neighbor report element 900 to support multicast communication. FIG. 9B illustrates an exemplary format of BSSID information 904, according to some examples to support multicast communication. BSSID information 904 can include different fields such as, but not limited to, AP reachability 921, security 922, key scope 923, capabilities 924, mobility domain 925, high throughput 926, very high throughput 927, FTM 928, high efficiency 929, FR-BSS 930, GCR-TWT 931, GC for unassociated 932, all GC 933, and reserved 934. The number under each field of BSSID information 904 represents exemplary size of the respective field of BSSID information 904 in bits.

According to some examples, GCR-TWT field 931 in BSSID information 904 of neighbor report element 900 can be used to indicate whether the corresponding BSS is capable of transmitting multicast transmissions in multicast service periods. For example, if GCR-TWT field 931 is set to a first value (e.g., "1"), AP 110 indicates that the corresponding BSS is capable of transmitting multicast transmissions in multicast service periods.

GC for unassociated field 932 in BSSID information 904 of neighbor report element 900 can be used to indicate whether the corresponding BSS is capable of transmitting multicast transmissions for unassociated electronic devices, according to some embodiments. For example, if GCR-TWT field 931 is set to a first value (e.g., "1"), AP 110 indicates that the corresponding BSS is capable of transmitting multicast transmissions for unassociated electronic devices.

If all GC field 933 in BSSID information 904 of neighbor report element 900 is set to a first value (e.g., "1"), AP 110 indicates that the corresponding BSS is recommended to transmit all multicast transmissions, according to some embodiments. For instance, the electronic devices associating to AP 110 are recommended to request multicast transmissions and set their request (e.g., GCR delivery) for the multicast packets only in this corresponding BSS.

Alternatively, setting all GC field 933 in BSSID information 904 of neighbor report element 900 to a second value (e.g., "0") may indicate that AP 110 transmits only the multicast transmissions that are needed for network maintenance and service discovery.

In some examples, AP 110 can be configured to control multicast communications over different channels to optimize traffic over these channels. For example, AP 110 can be configured to indicate within neighbor report element 900 which BSS is used for transmission of multicast packets. In one example, a low frequency band (e.g., 2.4 GHz band) may have a large coverage and AP 110 can use the BSS operating in this low frequency band for transmission of multicast packets. AP 110 can allocate one BSS for transmission of multicast packets for unassociated electronic devices, according to some embodiments. AP 110 can allocate one or more other BSSs for transmission of multicast packets for associated electronic devices.

According to some embodiments, if AP 110 receives multiple requests for multiple group addressed multicast packets, AP 110 can allocate transmission of each one of the multiple group addressed multicast packets to one BSS. In other words, different BSSs can carry different group addressed multicast packets in order to balance BSSs traffic loads. In one example, AP 110 receives, from a first group of electronic devices, a request for multicast packets associated with a first group address and receives, from a second group of electronic devices, a request for multicast packets associated with a second group address. AP 110 is configured to assign the multicast packets associated with the first group address to a first BSS (e.g., a first one of the plurality of channels) and to assign the multicast packets associated with the second group address to a second BSS (e.g., a second one of the plurality of channels different than the first one of the plurality of channels.) AP 110 is further configured to communicate the assigned BSSs (e.g., the assigned first and second ones of the plurality of channels) to the group of electronic devices and the second group of electronic devices using, for example, neighbor report element 900. AP 110 may recommend a sink electronic device to change its BSS depending on which one of the multiple group addressed multicast packets the sink electronic device desires to receive.

Figure 10:
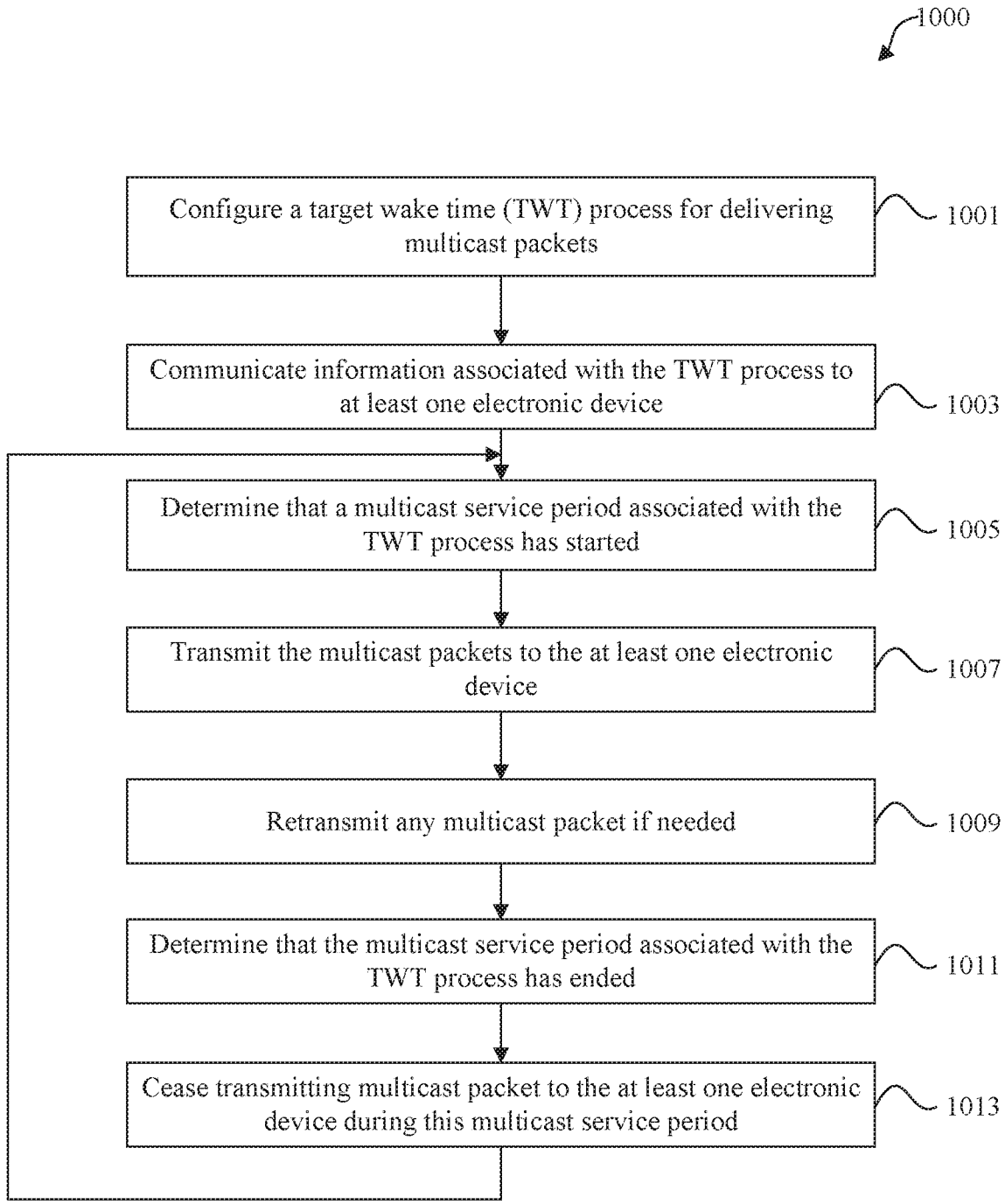
FIG. 10 illustrates an example method for a wireless system supporting implementing TWT process/scheme in multicast communication, according to some embodiments of the disclosure.

FIG. 10 illustrates an example method 1000 for a wireless system supporting implementing TWT process/scheme in multicast communication, according to some embodiments of the disclosure. As a convenience and not a limitation, FIG. 10 may be described with regard to elements of FIGS. 1-9. Method 1000 may represent the operation of source electronic device 110 of FIG. 1 implementing TWT process in the multicast communication. Method 1000 may also be performed by system 200 of FIG. 2 or computer system 1100 of FIG. 11.

At 1001, source electronic device 110 configures a TWT process/scheme for delivering one or more multicast packets. According to some examples, configuring the TWT process can include receiving a request from at least one electronic device in a group of electronic devices for the TWT process and determining a TWT schedule in response to the request. The TWT schedule can include information such as, but not limited to, a TWT start time indicating when the TWT process begins, information associated with a multicast service period such as the duration of the multicast service period, a repetition interval indicating an interval for repeating the multicast service periods, and a flow identifier indicating that the TWT process is an individual TWT agreement and is associated with delivering the multicast packets.

Additionally or alternatively, configuring the TWT process can include determining a broadcast TWT schedule. The broadcast TWT schedule can include information such as, but not limited to, a TWT start time indicating when the TWT process begins, information associated with a multicast service period such as the duration of the multicast service period, a repetition interval indicating an interval for repeating the multicast service periods, and a TWT recommendation field indicating a retransmission process associated with the transmission of the multicast packets.

At 1003, source electronic device 110 communicates information associated with the TWT process to at least one electronic device. For example, in response to receiving the request from the at least one electronic device in a group of electronic devices for the TWT process, source electronic device 110 transmits a response to the electronic device. The response can include information associated with the TWT process such as, but not limited to, the TWT schedule. In another example, to communicate the information associated with the TWT process to at least one electronic device, source electronic device 110 can advertise information associated with the TWT process such as, but not limited to, the broadcast TWT schedule in a beacon.

At 1005, source electronic device 110 determines whether a multicast service period associated with the TWT process has started. Source electronic device 110 can determine the start of the multicast service period based at least on the TWT schedule and/or the broadcast TWT schedule.

At 1007, source electronic device 110 transmits the one or more multicast packets to the (sink) electronic device(s). The sink electronic devices can include associated and/or unassociated sink electronic devices. At 1009, source electronic device 110 may retransmit any of the multicast packets, if needed. Different retransmission modes were discussed earlier. Source electronic device 110 uses one or more of the retransmission modes depending on the configured TWT process.

At 1011, source electronic device 110 determines whether the multicast service period associated with the TWT process has ended or whether the remainder of the service period is needed for the frames transmissions. Source electronic device 110 can determine the end of the multicast service period based at least on the TWT schedule and/or the broadcast TWT schedule. At 1013, source electronic device 110 cease transmission of multicast packets during this multicast service period when source electronic device 110 determines that the multicast service period associated with the TWT process has ended. Source electronic device 110 can implement early termination mechanisms, as discussed in detail above. Source electronic device 110 can repeat 1005-1013 for other multicast service periods of the TWT process.

Figure 11:
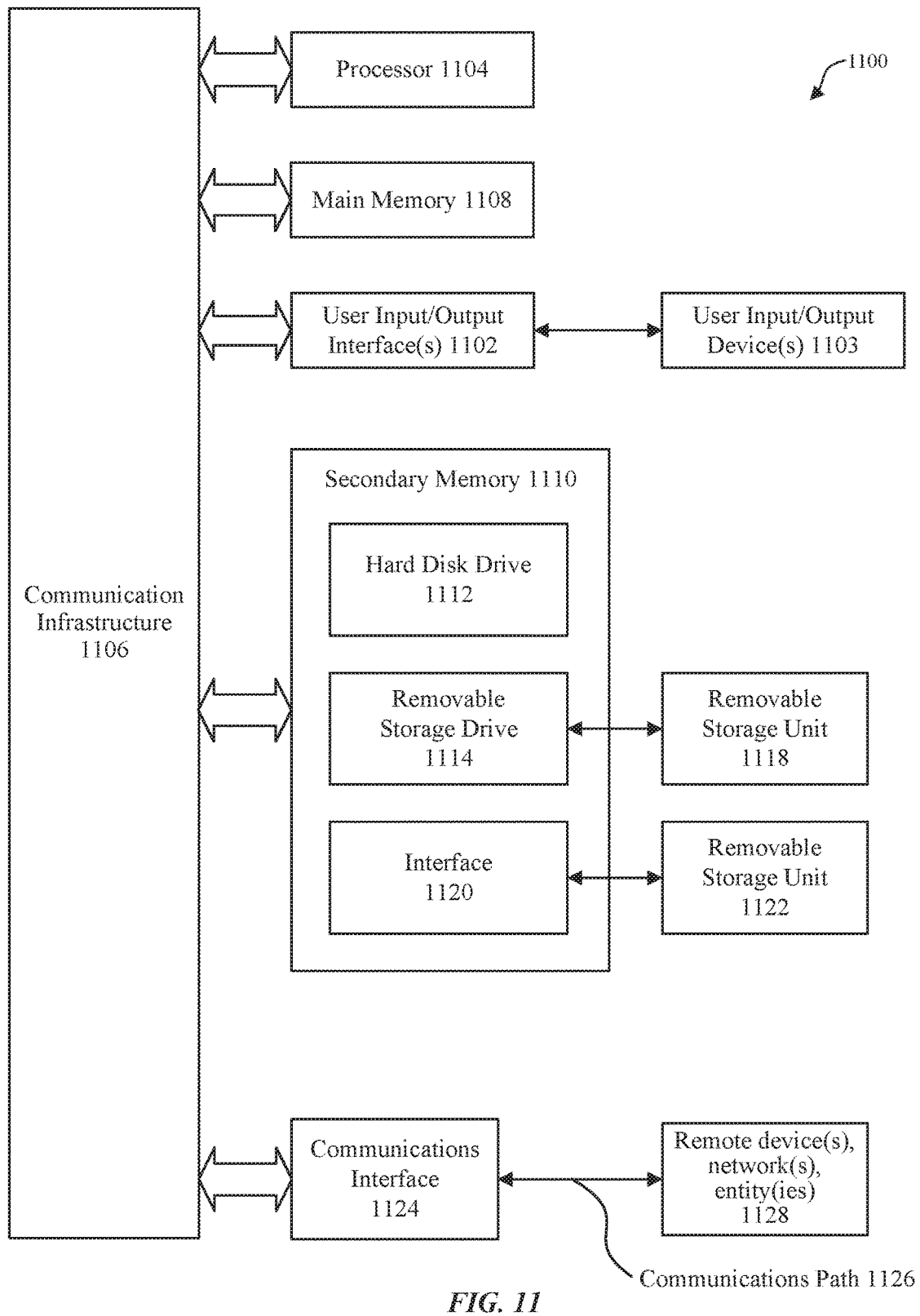
FIG. 11 is an example computer system for implementing some embodiments or portion(s) thereof.

Various embodiments can be implemented, for example, using one or more computer systems, such as computer system 1100 shown in FIG. 11. Computer system 1100 can be any well-known computer capable of performing the functions described herein such as devices 110, 120 of FIG. 1, or 200 of FIG. 2. Computer system 1100 includes one or more processors (also called central processing units, or CPUs), such as a processor 1104. Processor 1104 is connected to a communication infrastructure 1106 (e.g., a bus.) Computer system 1100 also includes user input/output device(s) 1103, such as monitors, keyboards, pointing devices, etc., that communicate with communication infrastructure 1106 through user input/output interface(s) 1102. Computer system 1100 also includes a main or primary memory 1108, such as random access memory (RAM). Main memory 1108 may include one or more levels of cache. Main memory 1108 has stored therein control logic (e.g., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 includes a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 reads from and/or writes to removable storage unit 1118 in a well-known manner.

According to some embodiments, secondary memory 1110 may include other means, instrumentalities or other approaches for allowing computer programs and/or other instructions and/or data to be accessed by computer system 1100. Such means, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 enables computer system 1100 to communicate and interact with any combination of remote devices, remote networks, remote entities, etc. (individually and collectively referenced by reference number 1128). For example, communication interface 1124 may allow computer system 1100 to communicate with remote devices 1128 over communications path 1126, which may be wired and/or wireless, and which may include any combination of LANs, WANs, the Internet, etc. Control logic and/or data may be transmitted to and from computer system 1100 via communication path 1126.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1100, main memory 1108, secondary memory 1110 and removable storage units 1118 and 1122, as well as tangible articles of manufacture embodying any combination of the foregoing. Such control logic, when executed by one or more data processing devices (such as computer system 1100), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 11. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:
1. A method, comprising:
  configuring a target wake time (TWT) process for delivery of one or more multicast packets to a group of electronic devices to provide a multicast communication, wherein the configuring the TWT process comprises:
  determining a TWT schedule in response to the TWT process being an individual TWT agreement with at least one electronic device of the group of electronic devices for the multicast communication; and
  determining a broadcast TWT schedule in response to the TWT process being for the group of electronic devices for the multicast communication;
determining that a service period associated with the TWT process has started; and
transmitting, in accordance with the TWT process, the one or more multicast packets during the service period, wherein the one or more transmitted multicast packets are addressed to the group of electronic devices or are addressed to the at least one electronic device.

2. The method of claim 1, further comprising:
receiving, from an electronic device in the group of electronic devices, a request for an individually addressed copy of at least one of the one or more multicast packets; and
transmitting, responsive to the request, the individually addressed copy of the at least one of the one or more multicast packets.

3. The method of claim 1, wherein the configuring the TWT process further comprises:
receiving, from the at least one electronic device in the group of electronic devices, a request to perform the TWT process; and
transmitting, to the at least one electronic device in the group of electronic devices, a response comprising the TWT schedule.

4. The method of claim 3, wherein the TWT schedule comprises:
a TWT start time indicating when the TWT process begins;
a repetition interval indicating an interval for repeating the service period; and
a flow identifier indicating that the TWT process is the individual TWT agreement and is associated with delivering the one or more multicast packets.

5. The method of claim 1, wherein the broadcast TWT schedule indicates the service period during which the one or more multicast packets are to be transmitted and the configuring the TWT process further comprises:
advertising the broadcast TWT schedule in a beacon.

6. The method of claim 1, wherein the broadcast TWT schedule comprises:
a TWT start time indicating when the TWT process begins;
a repetition interval indicating an interval for repeating the service period; and
a TWT recommendation field indicating a retransmission process associated with the transmission of the one or more multicast packets.

7. The method of claim 6, wherein:
the TWT recommendation field, when set to a first value, indicates that block acknowledgment associated with the one or more multicast packets is available for the group of electronic devices;
the TWT recommendation field, when set to a second value, indicates that the block acknowledgment associated with the one or more multicast packets is not available for the group of electronic devices;
the TWT recommendation field, when set to a third value, indicates that the block acknowledgment associated with the one or more multicast packets is available for one or more unassociated TWT-capable electronic devices; and
the TWT recommendation field, when set to a fourth value, indicates that the block acknowledgment associated with the one or more multicast packets is not available for one or more unassociated TWT-capable electronic devices.

8. The method of claim 1, further comprising:
setting a More Data field in a media access control (MAC) header associated with at least one of the one or more multicast packets to a first value and an End of Service Period (EOSP) field in the MAC header associated with the at least one of the one or more multicast packets to a second value to indicate that one or more of the one or more multicast packets include packets that have not yet been transmitted.

9. The method of claim 1, further comprising:
setting a More Data field in a media access control (MAC) header associated with at least one of the one or more multicast packets to a first value and an End of Service Period (EOSP) field in the MAC header associated with the at least one of the one or more multicast packets to a second value to indicate that remaining one or more of the one or more multicast packets include retransmission data packets.

10. The method of claim 1, further comprising:
determining that at least one electronic device of the group of electronic devices operates in a power save mode; and
transmitting the one or more multicast packets to the group of electronic devices before retransmitting at least one of the one or more multicast packets.

11. The method of claim 1, further comprising:
determining at least one of a plurality of channels for transmitting the one or more multicast packets; and
informing the group of electronic devices of the at least one of the plurality of channels.

12. The method of claim 1, further comprising:
receiving, from an electronic device in the group of electronic devices, a request for the one or more multicast packets associated with a first group address;
receiving, from an electronic device in a second group of electronic devices, a request for one or more multicast packets associated with a second group address;
assigning the one or more multicast packets associated with the first group address to a first channel of a plurality of channels;
assigning the one or more multicast packets associated with the second group address to a second channel of the plurality of channels, different than the first channel; and
communicating the assigned first and second channels of the plurality of channels to the group of electronic devices and the second group of electronic devices.

13. An electronic device, comprising:
a transceiver configured to transmit and receive wireless communications; and
one or more processors communicatively coupled to the transceiver and configured to:
  configure a target wake time (TWT) process for delivering multicast packets to a group of electronic devices;
  communicate, using the transceiver, information associated with the TWT process to at least one electronic device in the group of electronic devices;

determine that a service period associated with the TWT process has started; and transmit, using the transceiver and in accordance with the TWT process, the multicast packets to the group of electronic devices during the service period, wherein an End Of Service Period (EOSP) field in a media access control (MAC) header associated with at least one of the multicast packets is set to a first value and a More Data field in the MAC header is set to a second value to indicate that one or more of the multicast packets in the service period have not yet been transmitted, or wherein the EOSP field in the MAC header is set to the first value and the More Data field in the MAC header is set to a third value to indicate that remaining one or more of the multicast packets in the service period are retransmission data packets.

14. The electronic device of claim 13, wherein to configure the TWT process, the one or more processors are configured to:

receive a request from the at least one electronic device in the group of electronic devices for the TWT process;

determine a TWT schedule in response to the request, wherein the TWT schedule includes the service period during which the multicast packets are to be transmitted; and transmit a response to the at least one electronic device, wherein the response includes the TWT schedule.

15. The electronic device of claim 13, wherein to configure the TWT process, the one or more processors are configured to:

determine a broadcast TWT schedule that indicates the service period during which the multicast packets are to be transmitted; and advertise the broadcast TWT schedule in a beacon.

16. The electronic device of claim 13, wherein the one or more processors are further configured to:

set the More Data field in the MAC header associated with at least one of the multicast packets to a fourth value indicating that a request for block acknowledgment will be transmitted.

17. The electronic device of claim 13, wherein the one or more processors are further configured to:

set the More Data field in the MAC header associated with at least one of the multicast packets to a fourth value indicating that a request for block acknowledgment will be transmitted for an electronic device within the group of electronic devices that did not receive at least one of the multicast packets.

18. The electronic device of claim 13, wherein the one or more processors are further configured to:

set the EOSP field in the MAC header associated with a last one of the multicast packets to indicate that no more multicast packets will be transmitted within the service period.

19. A non-transitory computer-readable medium storing instructions that, when executed by a processor of an electronic device, cause the processor to perform operations, the operations comprising:

configuring a target wake time (TWT) process for delivering multicast packets to a group of electronic devices, wherein the configuring the TWT process comprises:

determining a TWT schedule in response to a request for the TWT process from at least one electronic device in the group of electronic devices; or determining a broadcast TWT schedule;

determining that a service period associated with the TWT process has started;

setting a More Data field in a media access control (MAC) header associated with at least one of the multicast packets to a first value and an End of Service Period (EOSP) field in the MAC header associated with the at least one of the multicast packets to a second value to indicate that remaining one or more of the multicast packets in the service period are retransmission data packets; and transmitting, based on at least one of the TWT schedule or the broadcast TWT schedule, the multicast packets to the group of electronic devices during the service period.

* * * * *